US007334901B2

(12) United States Patent
El-Ghoroury

(10) Patent No.: US 7,334,901 B2
(45) Date of Patent: Feb. 26, 2008

(54) LOW PROFILE, LARGE SCREEN DISPLAY USING A REAR PROJECTION ARRAY SYSTEM

(75) Inventor: Hussein S. El-Ghoroury, Carlsbad, CA (US)

(73) Assignee: Ostendo Technologies, Inc., Carlsbad, CA (US)

( * ) Notice: Subject to any disclaimer, the term of this patent is extended or adjusted under 35 U.S.C. 154(b) by 320 days.

(21) Appl. No.: 11/112,366

(22) Filed: Apr. 22, 2005

(65) Prior Publication Data

US 2006/0238723 A1   Oct. 26, 2006

(51) Int. Cl.
- G03B 21/26 (2006.01)
- H04N 3/12 (2006.01)
- H04N 5/64 (2006.01)
- G06K 9/00 (2006.01)
- G09G 5/00 (2006.01)

(52) U.S. Cl. .............. 353/94; 353/121; 348/798; 348/840; 345/1.1; 345/1.3; 382/164

(58) Field of Classification Search .......... 353/31, 353/69, 94, 30, 77, 78, 121; 348/744, 798, 348/840; 382/164; 345/1.1, 1.3, 383
See application file for complete search history.

(56) References Cited

U.S. PATENT DOCUMENTS

| 4,974,037 A | 11/1990 | Inova |
| 5,136,390 A | 8/1992 | Inova et al. |
| 5,563,470 A | 10/1996 | Li .............................. 313/496 |
| 5,664,353 A | 9/1997 | Brauer et al. ................. 40/560 |
| 6,115,022 A | 9/2000 | Mayer, III et al. |
| 6,219,099 B1 | 4/2001 | Johnson et al. |

(Continued)

FOREIGN PATENT DOCUMENTS

JP    7-302064    11/1995

(Continued)

OTHER PUBLICATIONS

Mayer, Theo, "Design considerations and applications for innovative display optinos using projector arrays", SPIE, Jul. 1996, pp. 131-139, vol. 2650.

(Continued)

Primary Examiner—Melissa Jan Koval
(74) Attorney, Agent, or Firm—Blakely Sokoloff Taylor & Zafman LLP

(57) ABSTRACT

Low-profile, large screen display using a rear projection array system using an array of micro projectors, each comprised of a micro-display device, several optical components, a red/green/blue light emitting diode light source, a light sensor for each color and power driving and interface electronics circuits. The plurality of Micro Projectors are arranged as an array along the vertices of a grid to conjointly project a uniform and seamless image comprised of the collective projected output pixels (sub-image) of the array of Micro Projectors. The Array Controller processes output signals generated by the light sensors embedded in each Micro Projector in the array and generates pixel gray scale input and light source control signals for each of the Micro Projectors in the array to maintain uniform luminance and chromaticity (color-point) across the array. Various features are disclosed. including tapering and diffusion of the sub-image boundaries to form a single large display.

48 Claims, 12 Drawing Sheets

U.S. PATENT DOCUMENTS

| | | | |
|---|---|---|---|
| 6,224,216 B1 | 5/2001 | Parker et al. | 353/31 |
| 6,310,650 B1 | 10/2001 | Johnson et al. | |
| 6,377,306 B1 | 4/2002 | Johnson et al. | |
| 6,456,339 B1 | 9/2002 | Surati et al. | |
| 6,457,834 B1 | 10/2002 | Cotton et al. | 353/122 |
| 6,485,145 B1 | 11/2002 | Cotton et al. | 353/69 |
| 6,525,772 B2 | 2/2003 | Johnson et al. | |
| 6,538,705 B1 | 3/2003 | Higurashi et al. | 348/745 |
| 6,558,006 B2 | 5/2003 | Ioka | |
| 6,568,816 B2 | 5/2003 | Mayer, III et al. | |
| 6,611,241 B1* | 8/2003 | Firester et al. | 345/1.3 |
| 6,695,451 B1 | 2/2004 | Yamasaki et al. | |
| 6,715,886 B2 | 4/2004 | Cotton et al. | 353/69 |
| 6,728,032 B2 | 4/2004 | Peterson et al. | 359/460 |
| 6,733,138 B2 | 5/2004 | Raskar | |
| 6,751,019 B2 | 6/2004 | DeSanto et al. | 359/460 |
| 6,755,537 B1 | 6/2004 | Raskar et al. | |
| 6,760,075 B2 | 7/2004 | Mayer, III et al. | |
| 6,804,055 B2 | 10/2004 | Peterson et al. | 359/457 |
| 6,834,965 B2 | 12/2004 | Raskar et al. | |
| 6,864,921 B2 | 3/2005 | Kaneda et al. | |
| 6,899,433 B2 | 5/2005 | Veligdan | |
| 2004/0032653 A1 | 2/2004 | Gohman | 359/434 |
| 2004/0240777 A1* | 12/2004 | Woodgate et al. | 385/16 |

FOREIGN PATENT DOCUMENTS

WO   WO-2004/112443 A1   12/2004

OTHER PUBLICATIONS

Chen, Yuqun et al., "Automatic Alignment of High-Resolution Multi-Projector Displays Using An Un-Calibrated Camera", IEEE Visualization, Oct. 2000, pp. 125-130.

Stone, Maureen C., "Color and Brightness Appearance Issued for Tiled Displays", Submitted to Computer Graphics and Applications, Mar. 1, 2001.

Raskar, Ramesh, "A Low-Cost Projector Mosaic with Fast Registration", ACCV2002: The 5th Asian Conference on Computer Vision, Jan. 23-25, 2002, Melbourne, Australia, pp. 1-6.

Majumder, Aditi et al., "Color Nonuniformity in Projection-Based Displays: Analysis and Solutions", IEEE Transactions on Visualization and Computer Graphics, 2003, pp. 100-111.

Brown, Michael et al., "Camera-Based Calibration Techniques for Seamless Multiprojector Displays", IEEE Transactions on Visualization and Computer Graphics, Mar./Apr. 2005, pp. 193-206, vol. 11, No. 2.

Lowe, Anthony C., et al., "A Novel Approach to Tiled Displays", Society for Information Display Digest, 2000, 13.3—pp. 1-4.

Krusius, J.P., et al., "Seamless Tiling of AMLCDs for Large Area Displays", Society for Information Display Digest, 2002, 8.1—pp. 1-4.

Krusius, J.P., et al., "Seamless Tiling Technology for Large Direct-View Color AMLCD's", Society for Information Display Digest, 2000, 30.3—pp. 1-3.

McLauglin, Charles W., "Progress in Projection and Large-Area Displays", Proceedings of the IEEE, Apr. 2002, pp. 521-532, vol. 90, No. 4.

Needham, Barbara, "Case Study: Building the Market for a Tiled-Display Solution", Information Display, Oct. 2003, pp. 20-25.

* cited by examiner

LOW PROFILE, LARGE SCREEN DISPLAY USING A REAR PROJECTION ARRAY SYSTEM

BACKGROUND OF THE INVENTION

1. Field of the Invention

The present invention relates to method, apparatus, and system to build a low-profile, large screen digital rear projection display device.

2. Prior Art

The advent of digital high definition (HD) video technology is causing a phenomenal demand for HD televisions (HDTV) and HD display devices with large screen sizes (greater than 50" screen diagonal). Several display technologies are poised to address this demand; including Plasma Display Panel (PDP), Liquid Crystal Display (LCD), and micro-display based Rear Projection (RP) display devices that use a digital micro-mirror device (DMD) or a liquid crystal on silicon (LCOS) device. Each of these competing technologies has pros and cons: (1) for a given screen diagonal, PDP and LCD displays are generally more expensive than Rear Projection displays; (2) PDP and LCD displays generally are much thinner than Rear Projection displays; (3) although PDP and LCD displays are generally thin enough to mount on a wall, such displays tend to be heavy enough that mounting on a wall can be difficult; (4) Rear Projection displays are typically more cost-effective than PDP and LCD displays; and (5) Rear Projection displays do not offer a low-profile form-factor, as a result may occupy too much space in a room, often making a Rear Projection display not being the display of choice as a large screen display.

For the purpose of this background discussion, the following parameters are used for quantitative comparison of the form-factor of the various display technologies:

R1 being the depth to screen diagonal ratio; and

R2 being total height to screen height ratio.

PDP and LCD displays have form factor ratios R1 in the range of 0.12 to 0.15 and R2 in the range of 1.05 to 1.07. In comparison, a typical rear projection display has form factor ratios R1 in the range of 0.4 to 0.5 and R2 in the range of 1.3 to 1.5. In the following background discussion, a display device is viewed to have a low profile when its form factor ratio R1 is in the range of 0.15 or less and R2 ratio is in the range of 1.07 or less.

FIG. 1 illustrates a typical rear projection display device prior art. In general, the rear projection display device 100 is comprised of a projection optical engine 110, folding mirrors 120 and 125, and a screen 130. The projection optical engine 110 is further comprised of projection optics 111, a color wheel 112, a light source lamp 113, a cooling fan 114, a micro-display device 115 (such as a DMD or an LCOS device), with a cooling fin 118, mounted together with the micro-display device drive electronics on the formatter board 117, which in turn is mounted to the chassis of the optical engine 110. The projection optical engine 110 generates the image to be displayed, which is then directed toward the screen 130 by the folding mirrors 120 and 125. The optical engine generates the image to be projected by modulating the light generated by the light source lamp 113, using a micro-display device 115, with the pixel gray scale input after the light passes through the red, green and blue segments of the color wheel 112. The electronics on the formatter board 117 synchronize the operation of the micro-display device with the sequential order of the red (R), green (G) and blue (B) segments of the color wheel 112. The depth of the rear projection display device 100 depends on its projection screen 130 diagonal, the throw ratio characteristics (defined as the ratio of the throw distance to the screen diagonal) of the projection optics 111, and the number folding mirrors 120 and 125 used. Currently marketed rear projection devices with 50" screen diagonal that use a single folding mirror and an optical engine having 0.45 throw ratio have 15" depth and 7.5" of height under the screen, making its form factor ratios R1=0.3 and R2=1.37.

The efficiency of currently marketed rear projection display devices, in terms of luminance output at the screen relative to the luminance input of the light source lamp 113, is typically in the range of 9% to 12%. This poor luminance efficiency of rear projection display devices is primarily attributed to the fact that the color wheel 112 blocks at least ⅔ of the luminance generated by the light source. When combined with the efficiency of the light source lamp 113 itself, the poor luminance efficiency of rear projection display devices contribute to creating a thermal management problem that typically requires at least one cooling fan 114 and an additional cooling fin 11. This thermal management problem tends to put a limit on the luminance of the light source lamp 113 that can be used, thus dictating the need to use a projection screen 130 with a diffusion component as well as a fresnel component to collimate the projection output. The addition of a fresnel component to the screen 130 adds cost and makes the brightness of the screen vary with the viewing angle. In addition to having a typically poor efficiency, the high-pressure arc lamps typically used as a light source lamp 113 needed to generate sufficient luminance for large screen projection also have very poor lifetime and reliability. Such poor reliability when combined with the inherently poor reliability of the motor driven color wheel and cooling fan makes the overall reliability of large screen rear projection devices of FIG. 1 even worse.

Thin rear projection display devices with large screen diagonal have been developed that have a depth in the range of 12". However, such thinner rear projection display devices typically rely on the use of aspherical mirrors, which are difficult to manufacture and difficult to align, which results in the display becoming expensive (see U.S. Pat. Nos. 6,485,145, 6,457,834, 6,715,886 and 6,751,019). FIG. 2 illustrates another prior art thin rear projection display device 200 that overcomes the use of aspherical mirrors (see U.S. Pat. Nos. 6,728,032 and 6,804,055 and U.S. Patent Application Publication No. 2004/0032653). The thin rear projection display device 200, illustrated in FIG. 2, includes a wide-angle optical engine 210 for projecting an image, a plurality of folding mirrors 220-230, and a screen 240 designed to act as a folding reflector as well as to display the projected image. The screen 240 Fresnel includes a plurality of angular offset reflective elements 250 configured to reflect light incident on the screen from one angle, and to transmit light incident on the screen from a second angle. The thin rear projection display device 200 achieves its thin depth by relying on the use of wide-angle optical engine, with typical throw ratio in the range of 0.12, and multiple folding of the projection light cone. The former technique tends to make the projection optics quite expensive while the latter technique tends to substantially increase the height needed under the screen area. Although the thin rear projection display device 200 of FIG. 2 could achieve a depth to screen diagonal ratio R1 in the range of 0.15, its total height to screen height ratio R2 could be in the range of 1.57. In effect the depth of the thin rear projection display device 200 of FIG. 2 is reduced at the expenses of substantially increasing the rear projection display cost and its total height to screen height ratio R2. Furthermore, the multiple light cone folding employed tends to severely complicate the light cone alignment, making the rear projection display device difficult to manufacture, thus more costly. In addition, the use of exotic fresnel designs combined with the use of multiple light cone folding tend to further degrade the luminance efficiency of the display device, thus making it have poor brightness performance. The use of a wide angle optical engine, a dual purpose screen, with a complex fresnel design, and multiple light cone folding makes the thin rear projection display device 200 of FIG. 2 substantially more expensive than the rear projection display device 100 illustrated in FIG. 1. Further, the thin rear projection display device 200 of FIG. 2 suffers from the same poor reliability performance as that of the rear projection display device 100 illustrated in FIG. 1.

FIG. 3 illustrates a prior art projection display device 300 approach that offers improved reliability (see U.S. Pat. No. 6,224,216). The prior art projection display device 300 attains improved reliability by using light emitting diode (LED) devices as a light source instead of the high-pressure arc lamps typically used as a light source in projection devices. The prior art projection display device 300 includes an array of red (R), green (G) and blue (B) LED devices 310 powered by a power supply 320, a fan 330 for cooling the LED array, an array cover plate 315, an optical fiber bundle 340 that guides the RGB light generated by the LED array to an optical integrator 350, a optical path lens group 360 that direct the generated light toward a micro-display device 370, a projection optics group 380 that projects the image generated by the micro-display device 370, and a display controller 390. The display controller 390 receives color image data from an external source and processes the image data into frame sequential red, green and blue image data, sequential frames of which are conveyed to the micro-display device 370 in proper synchronism with signals sent to the power supply 320 to turn on the array of LED devices 310 that emits the corresponding color. In the prior art projection display device 300 the high-pressure arc lamp and the color wheel, typically used in projection display devices such as display devices 100 and 200, are replaced by the LED array 310 with its emitted color being sequenced by the display controller 390. Although the primary motive of doing so would be to get rid of the inefficiencies, thermal management and reliability problems associated with the high-pressure arc lamp and the color wheel, in the prior art projection display device 300 the LED devices are placed in a relatively close vicinity, thus causing thermal management to reemerge as a problem that requires careful consideration, especially when LED devices performance degrades considerably when their junction temperature rises excessively. Furthermore, the prior art projection display device 300 attempts to use the LED array 310 to literally replace the high-pressure arc lamp as a light source in terms of its aperture and luminance output by using a complex system comprised of the LED array 310, array cover plate 315, optical fiber bundle 340, optical integrator 350, and optical path lens group 360, making the light source assembly quite cumbersome and complex to integrate, thus resulting in a complex and costly display device. In addition, the prior art projection display device 300 does not include any provisions to compensate for the fact that LED devices are nearly impossible to maintain a fixed color-point, because the performance of red, green and blue LED devices degrades at different rates and their color shifts with age and as the temperature changes. Furthermore, the prior art projection display device 300 does not include any provisions for sensing and controlling the color and brightness output of the LED devices, which is critical for maintaining a fixed color-point projection output. Because of the aforementioned weaknesses, the approach for using LED devices as a light source used in the prior art projection display device 300 would not be viable for use in large screen size rear projection display devices.

As it will become apparent in the following detailed description, the large screen size and low-profile rear projection display of this invention utilizes an array of micro projectors, each projecting a portion of the output sub-image tiled together to create a seamless composite image. Numerous prior art exists that pertains to displays that create an image by tiling its constituent segments. For example, in order to make a cost-effective large screen size LCD displays, U.S. Pat. No. 5,563,470 describes an approach for building large screen LCD displays by tiling smaller size LCD panels. "A Novel Approach to Tiled Displays", Lowe et al., Society for Information Display (SID) Digest 2000, "Case Study: Building the Market for a Tiled Display Solution", Needham, Information Display, October 2003, "Seamless Tiling Technology for Large Direct-View Color AMLCD's", Krusius et al., Society for Information Display (SID) Digest 2000 and "Seamless Tiling of AMLCD's for Large Area Displays", Krusius et al., Society for Information Display (SID) Digest 2002, all describe a technique for achieving visual continuity across the seams of tiled LCD display panels. U.S. Pat. No. 6,690,337 describes video display system that uses multiple tiled desktop display panels having visible seams with the display panels tilted to achieve visual continuity. Large venue wall displays that use tiling of multiple full size rear projection displays, although with visible seams, are commercially available from several suppliers, for example the stackable display cubes from Samsung and Mitsubishi. U.S. Pat. No. 6,254,239 describes an apparatus for large venue wall displays that use tiling of multiple full size rear projection display systems to generate a composite seamless image. U.S. Pat. Nos. 4,974,073, 5,136,390, 6,115,022 and 6,760,075 describe look-up-table based edge-blending methods for seamless integration of the images generated by multiple tiled video projectors. Although U.S. Pat. Nos. 4,974,073, 5,136,390, 6,115,022, 6,254,239 and 6,760,075 describe methods for seamless tiling of multiple projectors, these methods fail to address the critical issue of maintaining chromatic and luminance uniformity across the multiple projectors used. U.S. Pat. No. 6,568,816 deals with issue of having uniform chromaticity and luminance across the multiple projectors by using a single light source lamp with multiple light beam splitters to distribute the light generated by the single light source lamp to multiple projector heads. In effect the method described in U.S. Pat. No. 6,568,816 would attain a degree of chromatic and luminance uniformity across the multiple projectors at the expense of severely degrading the luminance efficiency due to light lose in the splitters. In general, the apparatus and methods described in U.S. Pat. Nos. 4,974,073, 5,136,390, 6,115,022, 6,254,239, 6,568,816 and 6,760,075 would be suitable for large venue wall displays and their resultant implementation are bulky and as such are not suitable for building consumer desired size and form factor large screen rear projection display devices.

In spite of the numerous existing prior art that pertains to displays that create an image by tiling its segments, none was found that describes an integrated, consumer desired size & form factor large screen (50" or larger screen diagonal) rear projection display device that generates a seamless composite image that is created by tiling its constituent sub-image segments.

In weighing the pros and cons of the various display technologies, consumers tend to be attracted to the low-profile form factor offered by PDP and LCD displays and often opt for a smaller screen size to overcome the generally higher cost of such displays. Given such a trend and the aforementioned weakness of currently available displays, a rear projection display that offers a high reliability large screen diagonal sizes with a low-profile form factor that is comparable to that of PDP and LCD displays; but with a price point that is comparable to that of current rear projection displays, is certain to have a significant market value.

BRIEF DESCRIPTION OF THE DRAWINGS

The invention is illustrated by way of example, and not by way of limitation, in the figures of the accompanying drawings in which like reference numerals refer to similar elements.

DETAILED DESCRIPTION OF THE PREFERRED EMBODIMENTS

Figure 1:
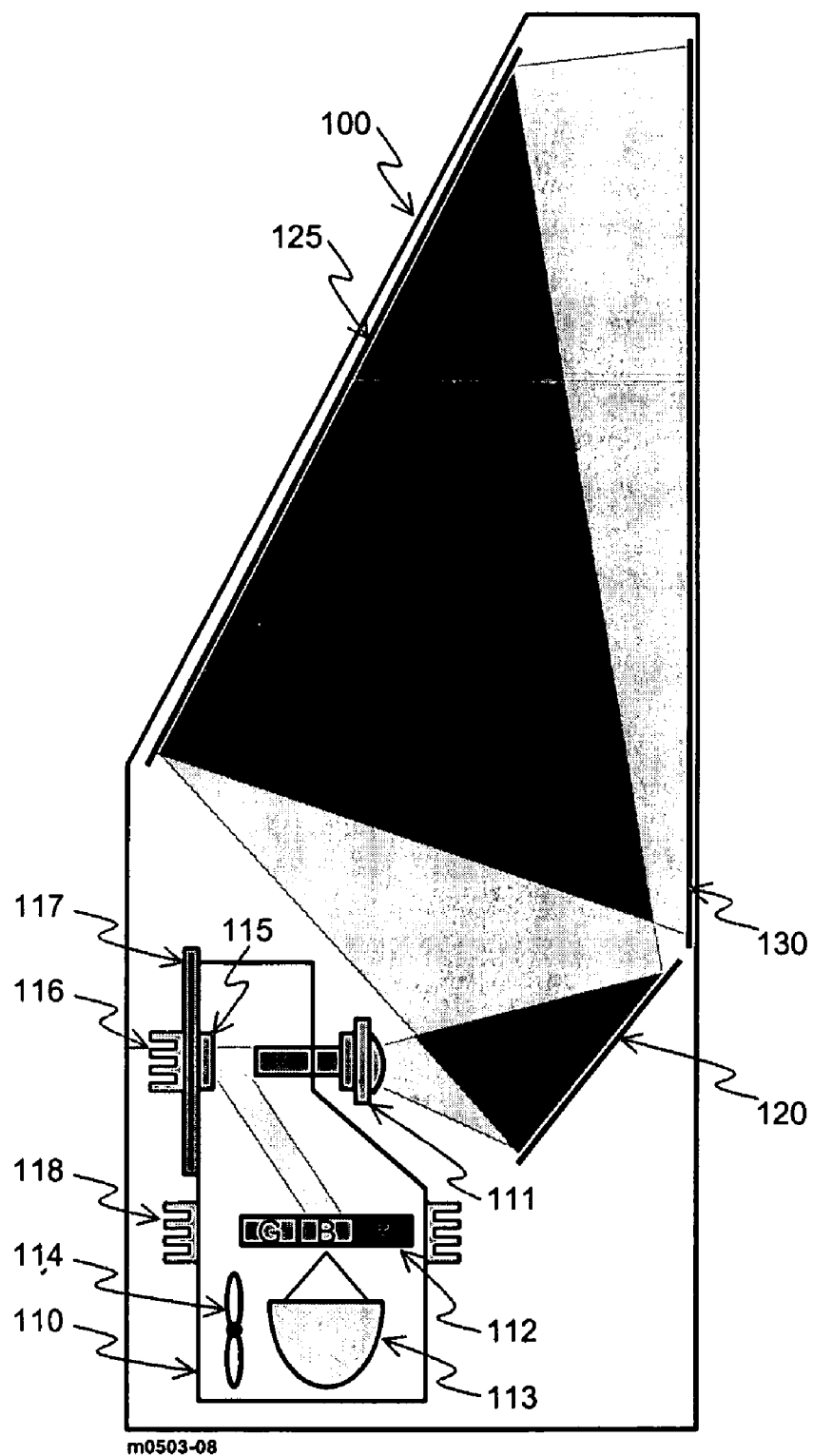
FIG. 1 illustrates prior art rear projection display architecture.

The preferred embodiments of the present invention provides apparatus, methods and systems for cost-effective large screen rear projection displays that have a low-profile form factor and high reliability. This objective is attained by using novel and inventive methods, apparatus, and systems that use an array of Micro Projectors spatially arranged to create a large screen digital display. By spatially dividing the large screen projection light cone into smaller light cones, a low-profile display having form factor ratios R1 in the range of 0.15 and R2 in the range of 1.05 can be built. The smaller projection light cones require a light source with smaller luminance that is well within the range of luminance that can be generated by a single LED device. Furthermore, the wide spatial placement of the LED devices across the array of Micro Projectors make for efficient thermal management. In addition, the fewer number of image pixels that need to be projected by each Micro Projector makes the optical components smaller, and more importantly, makes the die size of the micro-display device also smaller; thus making the Micro Projectors used in the array cost-effective. A closed-loop feedback system is used to maintain brightness and color uniformity across the projection array and to compensate for the LED device brightness and color drift with temperature and with aging. The resultant Rear Projection Array Display device is cost-effective, has a low-profile form factor, and exhibits high reliability.

Additional objectives and advantages of various aspects of this invention will be apparent from the following detailed description of a preferred embodiment thereof that proceeds with reference to the accompanying drawings. In that regard, references in the following detailed description of the present invention to "one embodiment" or "an embodiment" means that a particular feature, structure, or characteristics described in connection with the embodiment is included in at least one embodiment of the invention. The appearances of the phrase "in one embodiment" in various places in this detailed description are not necessarily all referring to the same embodiment.

A low-profile rear projection display system is described herein. In the following description, for the purpose of explanation, numerous specific details are set forth in order to provide a thorough understanding of the invention. It will be apparent, however, to one skilled in the art that the invention can be practiced with different specific details. In other instance, structures and devices are shown block diagram form in order to avoid obscuring the invention.

The low profile rear projection display device described herein, referred to as "Rear Projection Array Display", includes a plurality of Micro Projectors. The plurality of Micro Projectors comprising the Rear Projection Array Display is arranged as an array along the vertices of a grid to conjointly project a uniform and seamless image that is comprised of the collective projected sub-images generated by the array of Micro Projectors. An Array Controller provides each Micro Projector with its portion of the image to be projected and control signals to maintain brightness and color uniformity across the projected image.

Figure 4:
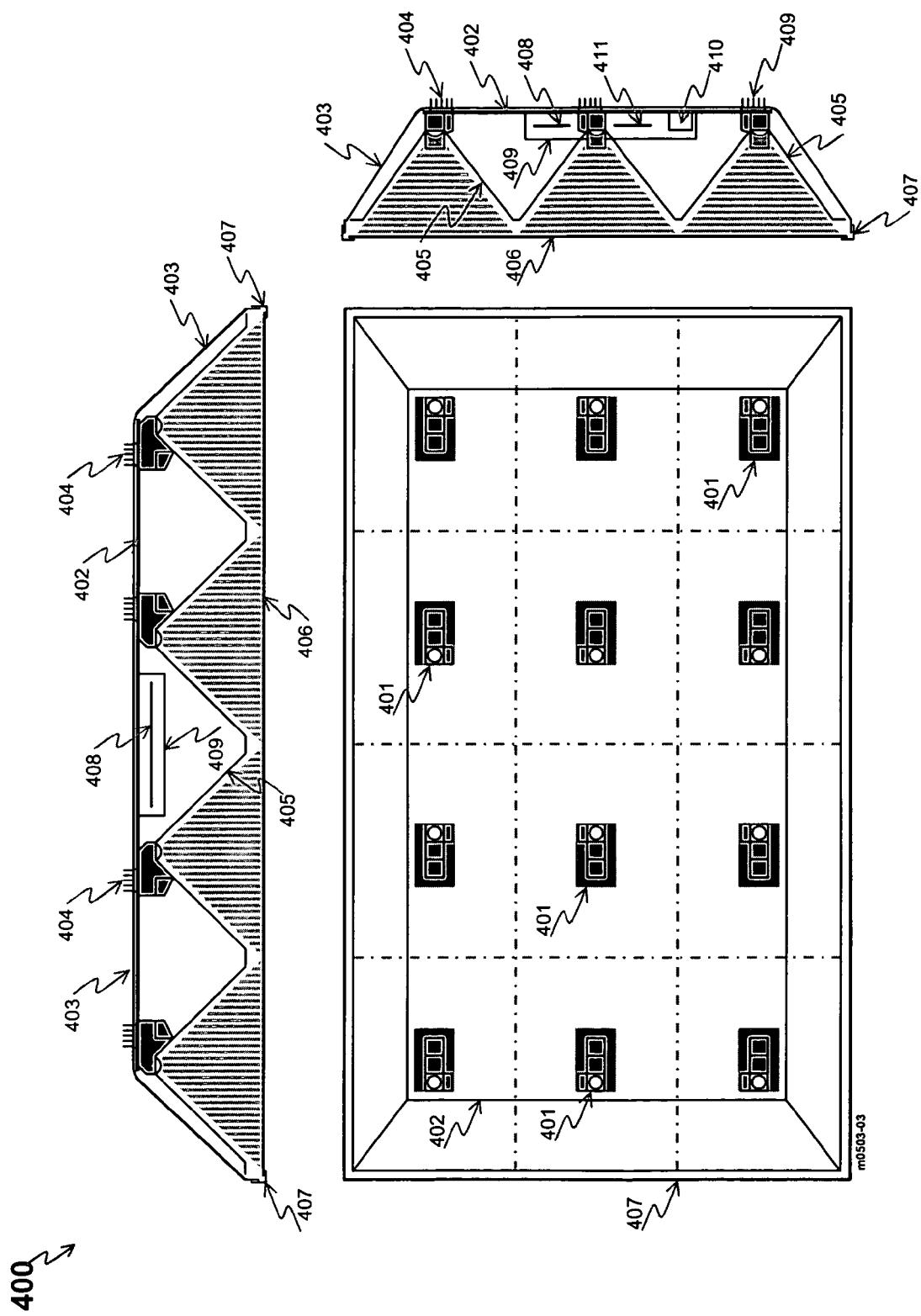
FIG. 4 illustrates cross-sectional views of the Rear Projection Array Display device.

FIG. 4 illustrates cross-sectional views of the Rear Projection Array Display device 400 of this invention. The Rear Projection Array Display device 400 is comprised of a plurality of Micro Projectors 401 mounted on a back plate 402, which in turn is mounted to the interior backside of the display chassis 403, a plurality of cooling fins 404 one being mounted to the backside of each Micro Projector 401 and protrude to the outside through openings at the back of the display chassis 403, a separator 405 which is assembled within the front opening of the display chassis 403, a projection screen 406 mounted to the backside of the aperture border of a bezel 407, which in turn is assembled to the front opening of the display chassis 403, and an Array Controller board 408 housed within an electronics-box 409, which in turn is mounted on the back plate 402.

In the cross-sectional views of FIG. 4 of the Rear Projection Array Display device 400, the separator 405 is used for confinement of the projection light cones of the Micro Projectors 401 and to prevent light leakage, the electronics-box 409, which is mounted to the back plate 402 between the projection light cones and within the envelope of the display chassis 403, is used for housing the Array Controller board 408 as well as the display power supply 410, and also acts as an electromagnetic interference (EMI) shield. The electronics-box 409 can also be used for housing other electronics boards 411, such as video and audio boards, which would be added to make the Rear Projection Array Display device 400 become a low-profile rear projection television (RPTV).

The embodiment of the Rear Projection Array display device of this invention illustrated in FIG. 4 shows a high definition (16:9 aspect ratio) large screen projection being achieved by using an array of 12 Micro Projectors. As a case example, if the screen diagonal of the Rear Projection Array device of FIG. 4 were 50", the image segment projected by each of the array of Micro Projectors 401 would have a 13.6" diagonal. In this case example, a Micro Projector 401 with 0.4 throw ratio would generate the required image segment diagonal at 5.45" throw distance, which would make the 50" screen diagonal Rear Projection Array Display device 400 of this invention have a total depth of less than 6.5" after allocating an extra 1" of depth behind the Micro Projectors 401. In this case example, the 50" screen diagonal Rear Projection Array Display device 400 of this invention illustrated in FIG. 4 would have 6.5" of depth and 26" of total height, which equate to form factor ratios R1=0.13 and R2=1.06. In using that same Micro Projector specifications of this case example, the Rear Projection Array Display device 400 of this invention illustrated in FIG. 4 with 60" screen diagonal would have 7.5" depth and 31" of total height, which equate to form factor ratios R=0.125 and R2=1.06. A skilled person would appreciate that using a Micro Projector 401 with a smaller throw ratio than 0.4 used in the above case example would result in a Rear Projection Array Display device with smaller R1 ratio.

The embodiment of the Rear Projection Array Display device 400 of this invention illustrated in FIG. 4 shows a high definition (16:9 aspect ratio) large screen projection being achieved by using an array of 12 Micro Projectors. A skilled person will appreciate that many configurations of the rear Projection Display device 400 that uses different number of Micro Projectors 401 than what is illustrated in FIG. 4 are possible. As a case example, if the resolution of the Rear Projection Array Display device 400 of FIG. 4 were 1280×720 pixels (720p HD resolution), the image segment projected by each of the array of Micro Projectors 401 would have 320×240 pixels. If the resolution of the Rear Projection Array Display device 400 of FIG. 4 were 1920×1080 pixels (1080p HD resolution), the image segment projected by each of the array of Micro Projectors 401 would have 480×360 pixels. In these case examples, the die size of the micro-display device 416 used to generate the image segments to be projected by each Micro Projector 401 would be $1/12^{th}$ of the die size of a rear projection display device with comparable resolution. Since the manufacturing yield of semiconductor devices is typically inversely proportional with its die size, this 1/12 reduction in the micro-display die size would result in an improvement in the micro-display device manufacturing yield by at least a factor of 12, which would subsequently result in a cost reduction by a factor much higher in magnitude.

Figure 2:
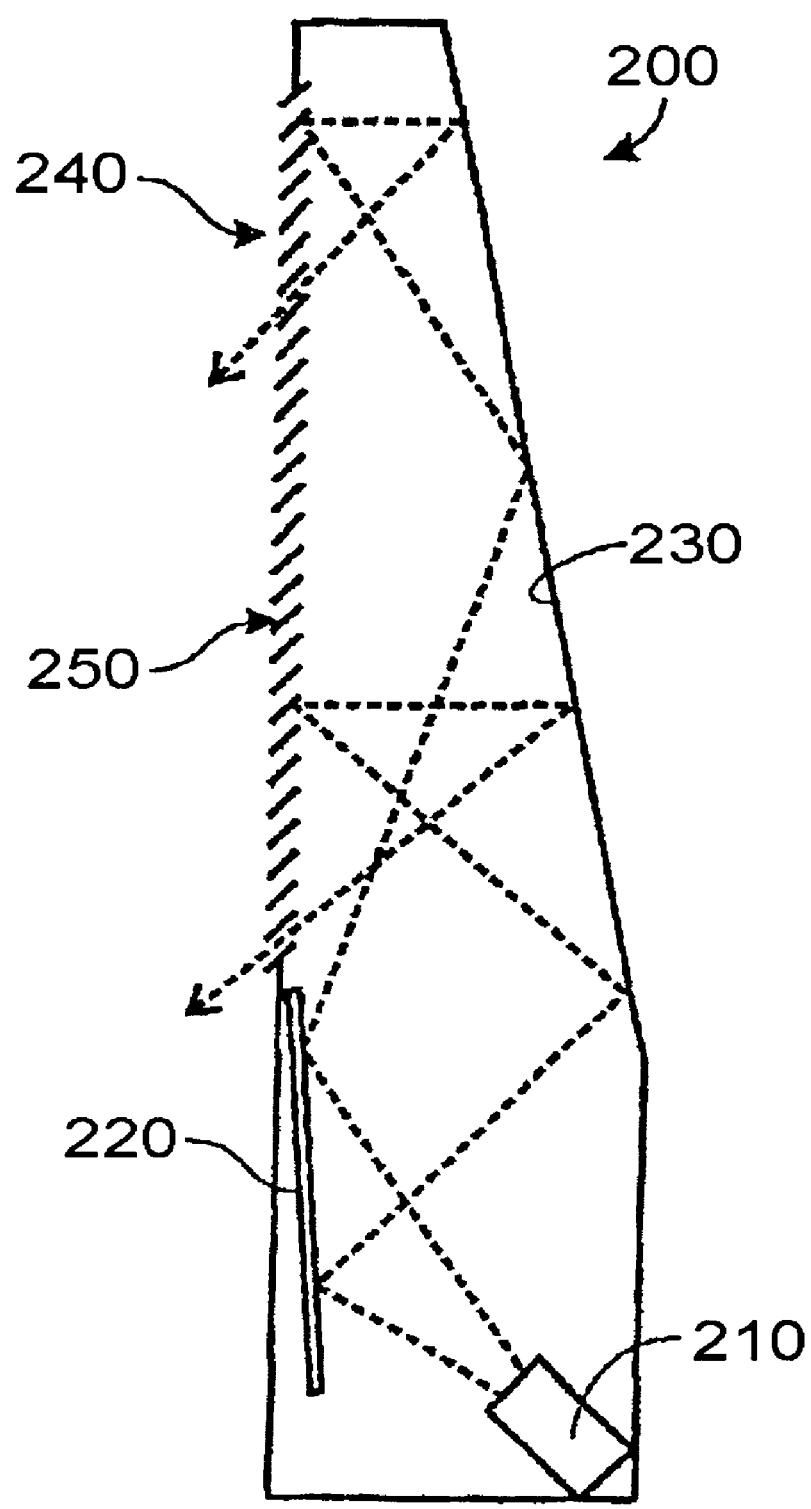
FIG. 2 illustrates prior art thin rear projection display architecture.
Figure 3:
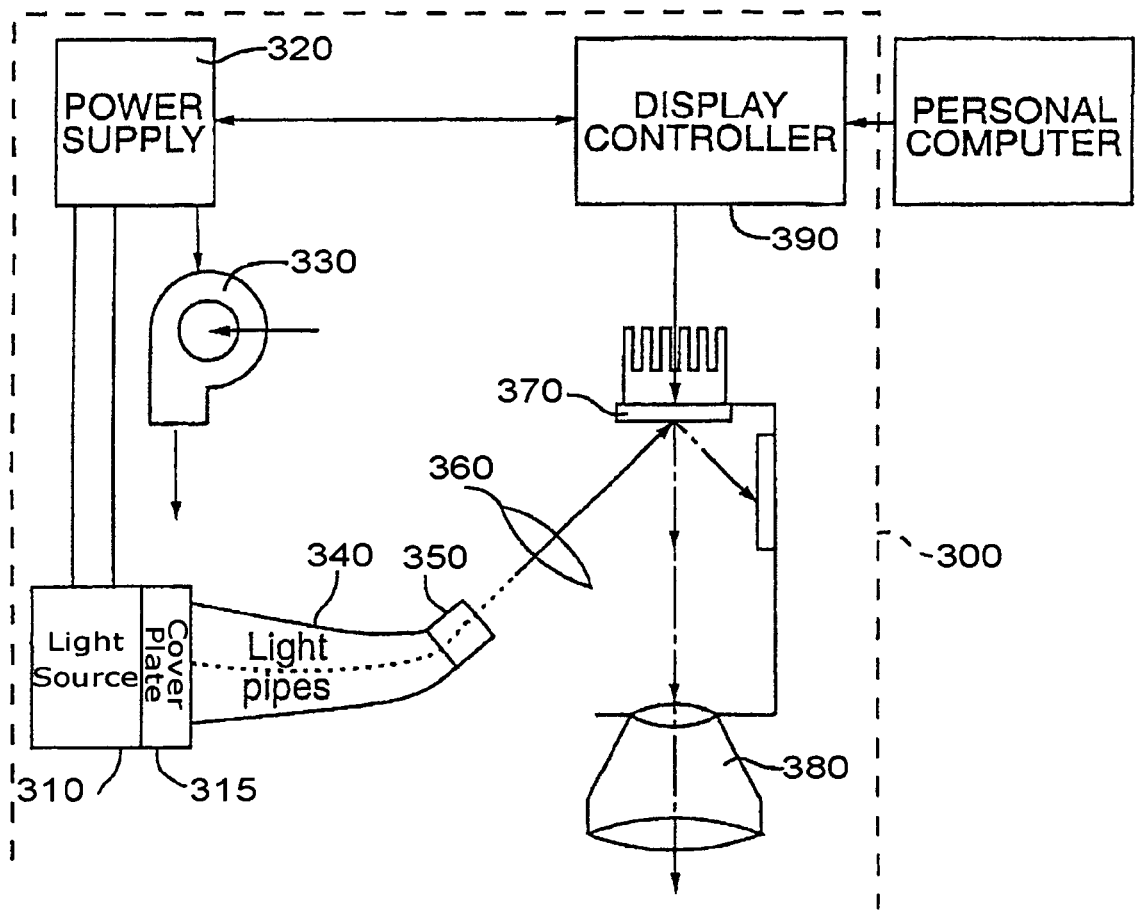
FIG. 3 illustrates a prior art projection display architecture that offers improved reliability.

The embodiment of the Rear Projection Array Display device of this invention illustrated in FIG. 4 shows a high definition (16:9 aspect ratio) large screen projection being achieved by using an array of 12 array of Micro Projectors 401. As a case example, if the screen diagonal of the Rear Projection Array Display device 400 of FIG. 4 were 50", the required projection output luminous flux that will make it have a brightness performance comparable to a conventional rear projection display device 100 with the same screen diagonal illuminated with a 150 watt high-pressure arc lamp would be in the range of 450 lumens. In dividing the required 450 lumens amongst the 12 image segments (sub-images) of the Rear Projection Array Display device 400 illustrated in FIG. 4, the output luminance flux of each of Micro Projectors 401 used in the array would be in the range of 37.5 lumens, which would be achieved with a Micro Projector 401 with an optical efficiency of 0.4 and using a an LED device with luminance flux output in the range of 83 lumens. Currently commercially available high-flux LED devices 412 can generate this level of luminance output at less than 3 watt of power dissipation, making the power dissipation of the Rear Projection Array Display device 400 of this case example, that is attributed to the illumination devices, totals less than 36 watt. This reduction by more than a factor of 4 in power dissipation of the illuminator (light source) would result in a substantially easier thermal management scheme and a significantly improved reliability, especially when (FIGS. 1 and 2) into account the placement of the LED devices within the Micro projectors 401 and their spatially distributed placement across the back plate 402, as illustrated in FIG. 4, and the vastly higher reliability of the LED devices when compared to a high pressure arc lamp.

With the rapid pace of advancement of LED device technology, LED devices that offer a luminance flux efficiency in excess of 50-80 lumen/watt are already starting to become commercially available. In using such high flux LED devices in the forgoing case example at 3 watt drive level; the Rear Projection Array Display device 400 would generate an image with luminance in the range of 800-1200 lumens output regardless of the viewing angle. For the prior art rear projection display devices 100 and 200 (FIGS. 1 and 2), such luminance output performance will require a more than 250 watt light source lamp 113, which would not be feasible in view of their poor luminance efficiency and the resultant thermal management and reliability problems. Furthermore, with the level of luminance output it can achieve using a 50-80 lumen/watt LED device, the Rear Projection Array Display device 400 will not require the use of a fresnel screen component, which will further contribute to reducing its cost.

In comparison with the conventional rear projection display devices 100 and 200, for screen diagonal 50" or larger, the Rear Projection Array Display device 400 of FIG. 4 would have form factor ratios that are comparable to those of the PDP and LCD display devices. Furthermore, the Rear Projection Array Display device 400 would attain a reliability that is vastly improved over the rear projection display devices 100 and 200, and even improved reliability over that of PDP and LCD devices, since it would not suffer from the pixel burnout problems PDP and LCD display devices had. In addition, for screen diagonal size of 50" and larger, the cost of the Rear Projection Array Display device 400 would be in the order of magnitude of the cost of rear projection display device 100, but significantly lower than the cost of PDP and LCD display devices with the same screen size. Furthermore, the Rear Projection Array Display device 400 would be more rugged because it does not use large size folding mirror as in the case of the rear projection displays 100 and 200. Lastly, the resolution of the Rear Projection Array Display device 400 can be increased without creating a significant manufacturing yield degradation for the micro-display device being used within its constituent Micro Projectors 401, thus making it possible to increase the resolution of the Rear Projection Array Display device 400 without a significant cost increase.

Figure 5A:
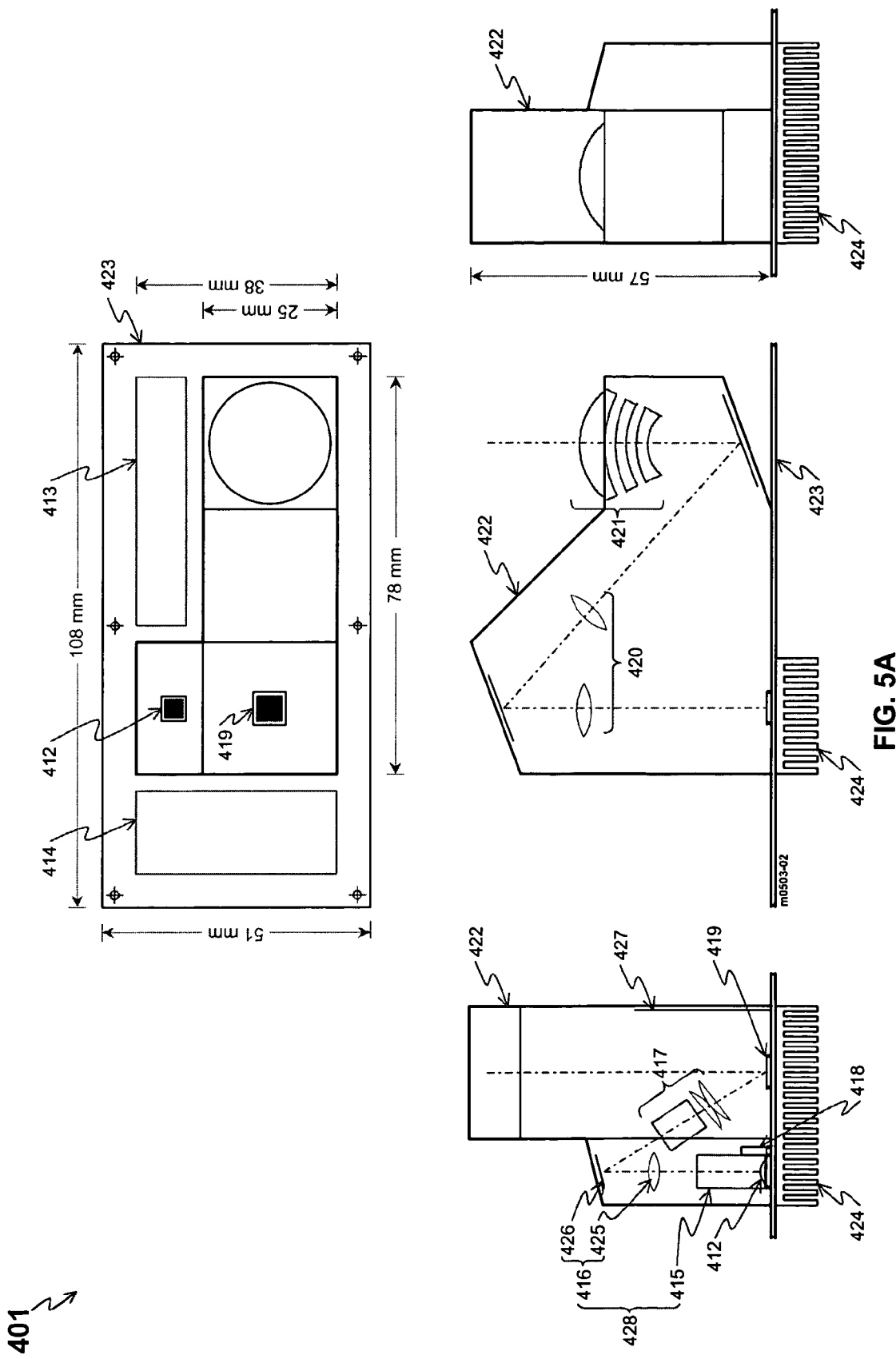
FIG. 5A illustrates cross-sectional views of the Micro Projector device.
Figure 5B:
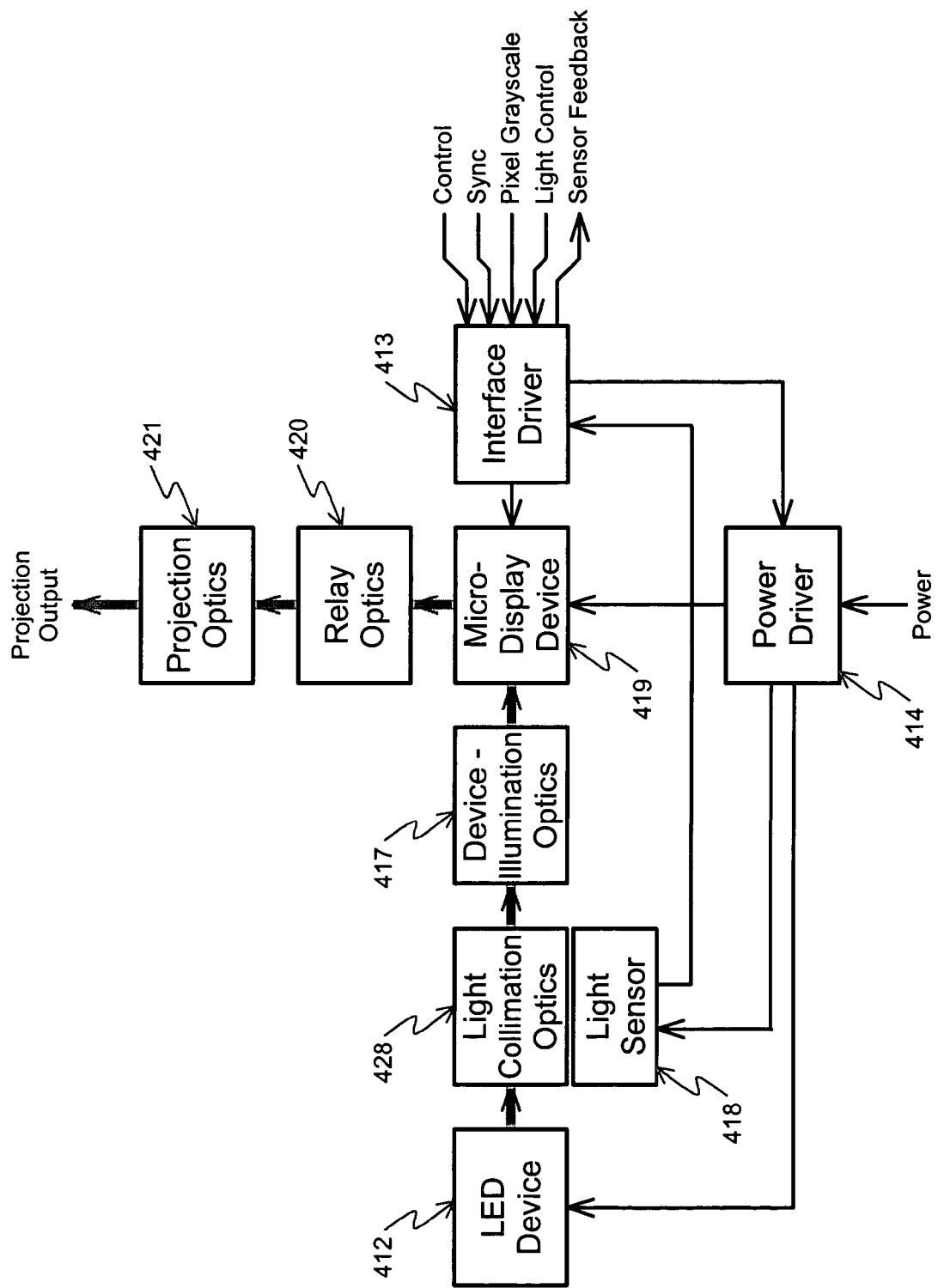
FIG. 5B illustrates a block diagram of the Micro Projector device.

Having described the underlying architecture of the Rear Projection Array Display device 400 of this invention, the following discussion provides detailed description of its constituent elements. FIG. 5A and FIG. 5B illustrate cross-sectional views and a block diagram, respectively, of the Micro Projector device 401 of this invention in which like reference numerals refer to similar elements. The Micro Projector 401 is comprised of an LED device 412, which generate red (R), green (G) and blue (B) light sequentially controlled by an input light control signal generated by the Array Controller 408 and coupled through the interface driver 413 and the power driver 414, light collimation optics 428, that includes a light integrator 415 and light path optics 416, which collectively direct the light generated by the LED device 412 toward the micro-display device illumination optics 417, a light sensor 418 which is coupled to the light integrator 415, a micro-display device 419 which modulates the light using the pixel gray scale signal generated by the Array Controller 408 and coupled through the interface driver 413, and set of relay optics 420 which directs the light reflected by the micro-display device 419 toward the projection optics 421.

The optical components comprising the light collimation optics 428; namely the light integrator 415, and the light path optics 416, the micro-display device illumination optics 417, the relay optics 420, and the projection optics 421 are held together within the Micro Projector enclosure 422. The Micro Projector enclosure 422, measuring at the base about 38×78 mm and 57 mm in height, would be typically fabricated using aluminum/magnesium alloy die-cast or high-precision injection molded polycarbonate plastic. The LED device 412, the micro-display device 419, the interface driver 413 and the power driver 414 are assembled on a printed circuit board 423. The Micro Projector enclosure 422, with the optical components 415, 416, 417, 420 and 421 assembled together as a single subassembly, are mounted on the printed circuit board 423, in respective alignment with the light-emitting surface of the LED device 412 and the reflective surface area of the micro-display device 419. The printed circuit board 423, having dimensions that measure about 51×108 mm, would have multiple screw holes for mounting the entire Micro Projector 401 assembly described above into the back plate 402.

The LED device 412 would typically be comprised of R (625 nm wavelength), G (525 nm wavelength) and B (464 nm wavelength) Lambertian emitter thin-film LED dies assembled within a single component package which includes on its underside a heat dissipation slug that transfers the heat generated by the LED dies to a cooling fin 424 which is mounted on the backside of the printed circuit board 423. The luminance efficiency of the LED device 412 would typically be at least 35 lumen/watt for each color, and its light-emitting surface would typically measure less than 3×3 mm, such as an OSTAR LED device from OSRAM.

The optical integrator 415 has an input end cross-sectional area having at least the same dimensions as that of the LED device 412 light-emitting surface area. The optical integrator 415 would typically be an elongated tunnel type composed of a solid glass rod that relies on total internal reflection to transfer light through it and to create at its output end a uniform illumination filed. The optical integrator 415 would preferably include a cladding or reflective mirrored sidewalls, which serve to contain internal reflections. The input end of the optical integrator 415 is optically coupled to the light-emitting surface area of the LED device 412. The light sensor 418 is directly glued to the sidewall of the optical integrator 415 using optical adhesive and electrically coupled to the printed circuit board 423. The light sensor 418, having a light coupling surface area that would typically measure less than 3×3 mm, would include multiple photodiodes with R, G and B filters coated over the photodiodes. The light sensor 418 can be HDJD-S831 manufactured by Agilent.

The output end of the optical integrator 415 is coupled to a light path optics 416, which includes a lens group 425, and a light-redirecting mirror 426 that directs the light toward the micro-display device illumination optics 417. A skilled person would know the detailed design aspects of the light path optics 416.

The micro-display device 419 can be either a digital micro-mirror (DMD) device or a reflective liquid crystal on silicon (LCOS) device. In either case, the micro-display device 419 reflective aperture surface area would measure less than 3×4 mm (5 mm in diagonal) and would include a plurality of pixels whereby each pixel gray scale can be temporally modulated between on and off (on/off) states based on the input signal generated by the Array Controller 408. It is currently possible to manufacture micro-display devices with pixel density that exceeds 100,000 pixels in 3×4 mm surface area, for example Texas Instruments HD-2, HD-3 and HD-4 micro-mirror devices. The gray scale modulation of the pixels of the micro-display device 419 is achieved by either directing the light incident on the pixel from the illumination optics 417 toward the projection optics 421 or toward a light-absorbing surface 427, which is thermally coupled through the printed circuit board 423 to the cooling fin 424. The plurality of reflective pixels of the micro-display device 419 are assembled within a single component package which includes on its underside a heat dissipation slug that transfers the heat generated by the plurality of pixels to a cooling fin 424 which is mounted on the backside of the printed circuit board 423.

The micro-display device illumination optics 417 directs the light generated by the LED device and routed by the light collimation optics 428 toward the micro-display device 419. The relay optics 420 directs the light reflected by the micro-display device toward the projection optics 421. The depth of the Rear Projection Array 400 is primarily determined by the throw ratio characteristics of the projection optics 421. An array of 12 Micro Projector 401 with moderate complexity projection optics 421 having a 0.4 throw ratio would result in a 50" screen diagonal Rear Projection Array device 400 with less than 6.5" depth and a 60" screen diagonal Rear Projection Array device 400 with less than 7.5" depth. A skilled person would know the detailed design aspects of the optical coupling between the illumination optics 417, the micro-display device 419 and the relay optics 420 and the detailed design aspects of the micro-display device illumination optics 417, the relay optics 420 and the projection optics 421.

Figure 6A:
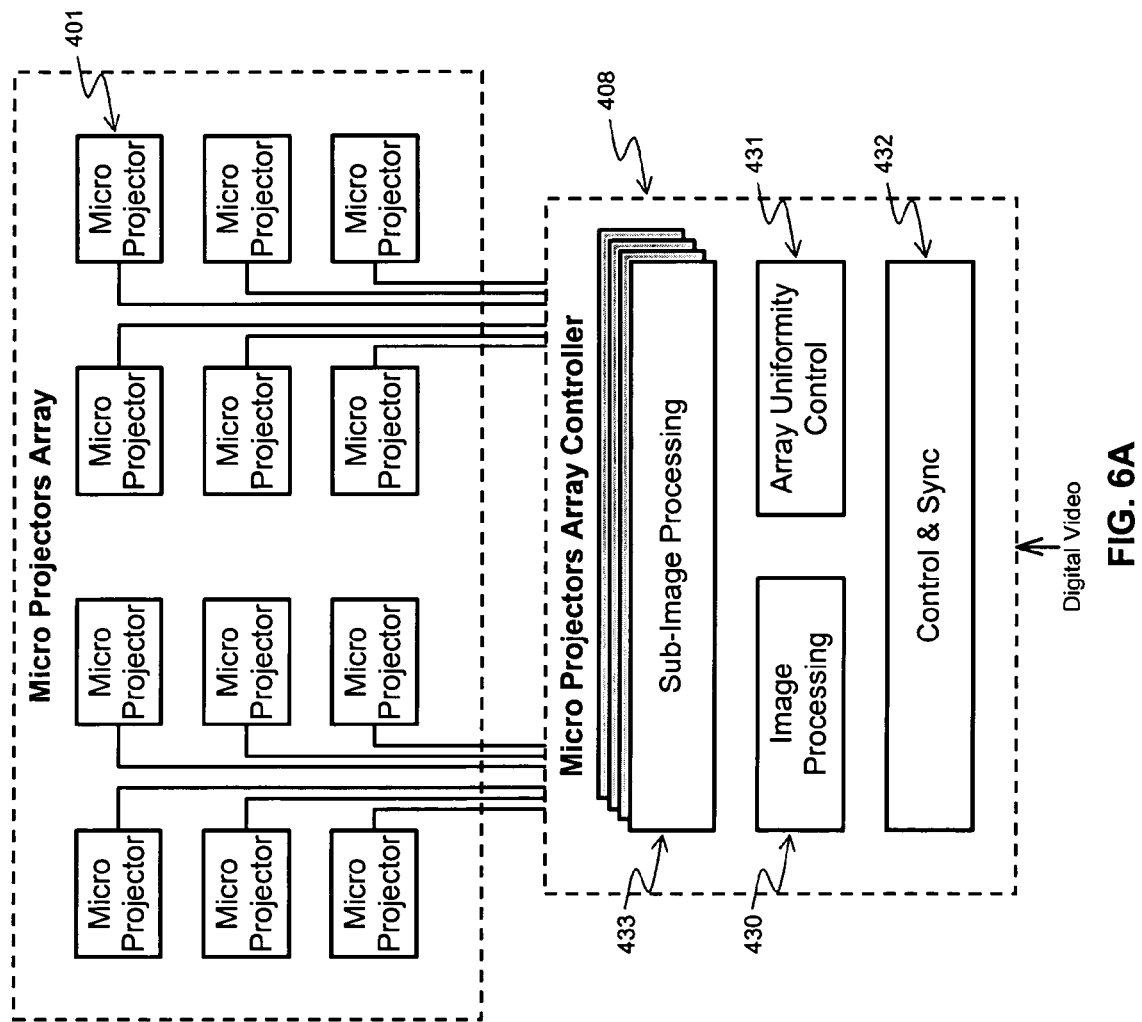
FIG. 6A illustrates the interfaces between the Micro Projectors Array and the Array Controller.
Figure 6B:
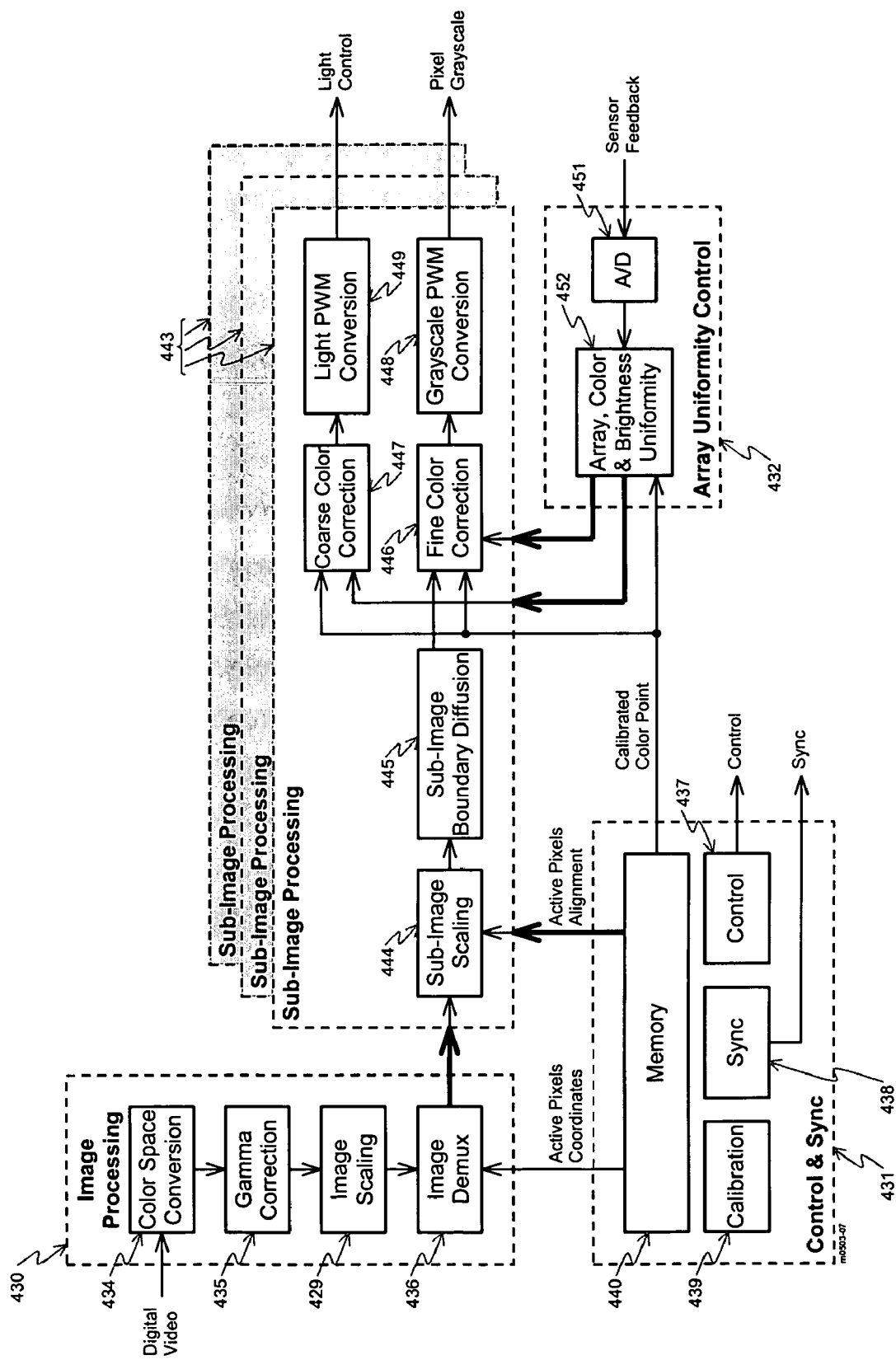
FIG. 6B illustrates a block diagram of the Array Controller.

FIG. 6A illustrates the coupling between the array of Micro Projectors 401 and the Array Controller 408. Referring to FIG. 5B, the pixel gray scale control signal, the color control signal, the SYNC signal, sensor feedback signal and power signal of each Micro Projector 401 in the array are routed to the Array Controller board 408 as illustrated in FIG. 6A. FIG. 6B illustrates the functional block diagram of the Array Controller 408 showing the functional elements where each signal interfaces. As illustrated in FIG. 6B, the Micro Projector Array Controller 408 is comprised of a Image Processing function 430, a Control & Sync function 431, an Array Uniformity Control function 432, and a plurality of Sub-image Processing functions 433 each corresponding to the plurality of Micro Projectors 401 used in the Rear Projection Array Display device 400.

As illustrated in FIG. 6B, the Image Processing function 430 is comprised of a Color Space Conversion block 434, a Gamma Correction block 435, an Image Scaling block 429 and an Image Demux block 436. The Color Space Conversion block 434 converts the digital video input to RGB format in cases when the digital video input is provided in luminance and color difference encoding (e.g., Y, $C_R$, $C_B$). The Gamma Correction block 435 removes the non-linear color response added to the digital video input to compensate for the inherent non-linearity of Cathode Ray Tubes (CRT), unlike a CRT, the micro-display device 419 is linear. The Image Scaling block 429 maintains the image aspect ratio and resizes the input video data to fit the resolution of the Rear Projection Array Display device 400.

The total number of pixels within the reflective aperture of the micro-display device 419 within each of the Micro Projectors 401 would be equal to the number of the sub-image pixels plus a margin of at least 5%. This will allow each of the Micro Projectors 401 within the Rear Projection Array device 400 to be able to project its designated sub-image plus a margin of at least 5% of additional pixels around the sub-image border. Out of the total number of pixels that can be projected by each of the Micro Projectors 401, the total number of pixels that are used to project the designated sub-image are referred to as the "Active Pixels". The Image Demux block 436, based on an Active Pixels Coordinates input that it receives from the Control & SYNC function 431, de-multiplexes the RGB gray scale data of the pixels constituting the input image to be projected into RGB gray scale data of the pixels corresponding to the sub-image to be projected by each of the Micro Projectors 401 and generates a sub-image pixels RGB gray scale data input for each of the Sub-image Processing functions 433.

As illustrated in FIG. 6B, the Control & SYNC function 431 is comprised of a Control block 437, a SYNC block 438, a Calibration block 439 and a Memory block 440. The Control block 437 generates control signals to each of the Micro Projectors 401 that are used to control the operational modes of the Micro Projectors 401, for example Power-Up Mode, Power-down Mode, Factory Test & Calibration Mode, and Run Mode. The SYNC block 438 generates the synchronization signals associated with the pixel gray scale and the light control signals. More details regarding the detailed structure of the synchronization signals generated by the SYNC block will be provided in subsequent parts of this invention detailed description.

The Calibration block 439, under the control of the Control block 437, runs during the test and calibration performed at the factory after the Rear Projection Array Display device 400 is assembled. The flow of the Calibration block 439, illustrated in FIG. 7, includes a sub-image mark & measure procedure 441 for marking the sub-image corners and measuring its color-point, a sub-image alignment procedure 442 which determine the coordinates of the sub-image projected by each of the Micro Projectors 401 within the Rear Projection Array Display device 400 screen aperture, and a color-point calibration procedure 443 which calibrates the light sensor 418 integrated within each Micro-Projector 401 against the projected sub-image measured color-point.

Figure 7:
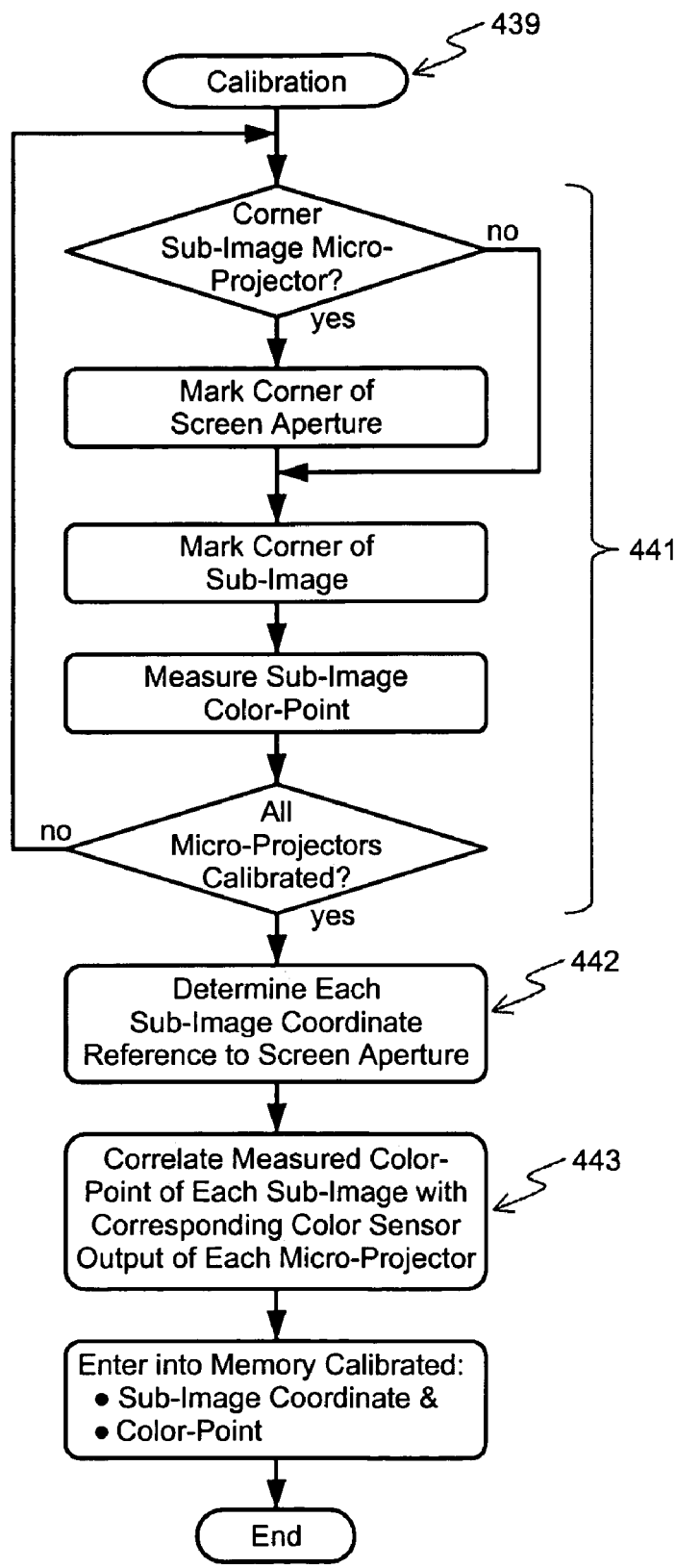
FIG. 7 illustrates the flow of the Micro Projector Array Display factory calibration procedure.

As illustrated in FIG. 7, the mark & measure procedure 441 includes the following steps: (1) For each Micro Projector 401 that is located at the corner of the projection screen aperture of the Rear Projection Array Display device 400, the corner of the projection screen aperture is marked using a curser positioned by the factory test operator and its coordinates are loaded by the Control block 437 into the memory block 440; (2) For each Micro Projector 401, the positions of the corners of the sub-image projected by that Micro Projector 401 are marked using a curser positioned by the factory test operator, and their coordinates are loaded by the Control block 437 into the memory block 440; and (3) For each Micro Projector 401, the color-point and the residual light leakage of each Micro Projector 401 is measured with a calorimeter and its value is entered by the factory test operator into the memory block 440. The residual light leakage is the measured luminance output of each Micro Projector 401 when all of its pixels are in the off state.

Figure 8A:
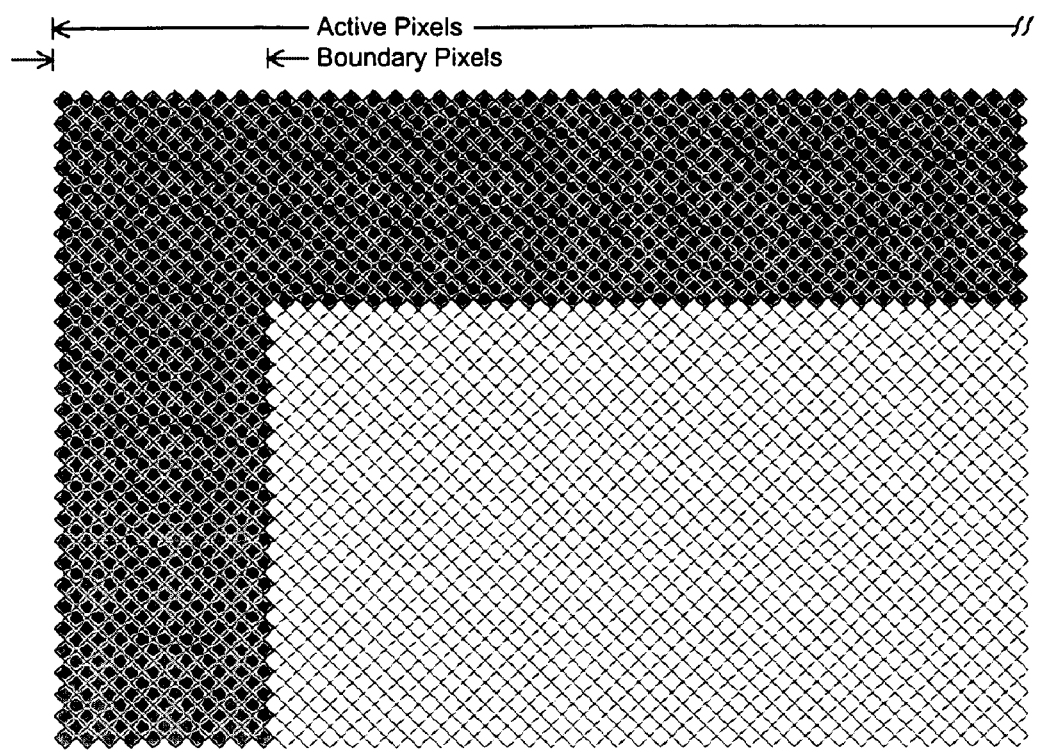
FIG. 8A illustrates the Micro projector sub-image regions.

The objective of the sub-image alignment procedure 442 is to determine the misalignment of the sub-images projected by the Micro Projectors 401 relative to the Rear Projection Array Display device 400 projection screen aperture that would be caused by manufacturing and assembly tolerances of the Rear Projection Array Display device 400 and its constituent subassemblies. Using the marked corners of the Rear Projection Array Display device 400 screen aperture as a frame of reference, the sub-image alignment procedure 442 determines the coordinates and alignment, relative to the Rear Projection Array Display device 400 screen aperture, of each of the sub-images generated by each Micro-Projectors 401, the number of pixels in each row of the vertical overlap regions and the number of pixels in each column of the horizontal overlap regions. The results of sub-image alignment procedure 442 are the coordinate and alignment of each Micro Projector 401 "Active Pixels" which include the overlap regions with adjacent sub-images along its boundaries (edges). As illustrated in FIG. 8A, the Active Pixels are the pixels projected by each of the Micro Projectors 401 including its overlap regions. The pixels of the sub-image that located in the overlap region are referred to as the "Boundary Pixels". The resultant coordinates, alignment and boundary pixels rows and columns count of each Micro Projector 401 sub-image are loaded into the memory block 440 to be used during the Run Mode of the Rear Projection Array Display device 400. Note that FIG. 8A represents an ideal situation (perfect alignment of the sub-image). The boundary pixels allow for misalignment by providing pixel space for relative shifting and rotating the sub-image as required. In preferred embodiments, the outer edges of the boundary pixels are defined by the limits of the Micro Projectors, the equivalent footprint of the separator 405 (FIG. 4) being substantially larger that each sub-image projected by the Micro Projectors.

The color-point calibration procedure 443 determines the bias between the measured color-point of each Micro Projector 401 and its embedded light sensor 418. The color-point calibration procedure 443 also sets the minimum gray scale level for each Micro Projector 401 at a value that equals at least four times its measured residual light leakage. The calibrated color-point bias and minimum gray scale level of each of the Micro-Projector 401 along with its desired color-point are used to generate a Calibrated Color-Point, which is loaded into the memory block 440 to be used during the Run Mode of the Rear Projection Array Display device 400.

Referring to FIG. 7, the objective of the processing performed by Array Uniformity Control function 432 is to maintain uniformity of the color (chromaticity) and brightness (luminance) of the sub-images projected by the Micro Projectors 401. The Array Uniformity Control function 432, which runs during the Run Mode of the Rear Projection Array Display device 400, processes the feedback signals from of the light sensor 418 of each Micro Projector 401, compares it to the corresponding Calibrated Color-Point stored in the memory block 440, and generates fine color correction and coarse color correction values, which in turn are provided to the Sub-image Processing functions 433. The outputs of the light sensor 418 of each of the Micro Projectors 401 are sampled sequentially and in synchronism with the color control slots described in subsequent details. For each of the Micro Projectors 401 the R, G and B brightness measured by the light sensor 418 is converted into an 8-bit value for each color with the analog-to-digital converter (A/D) 451, these measured RGB brightness are referred to as "measured color-point". For each Micro Projector 401, the Array Color & Brightness Uniformity block 452 calculates the deviation between the measured color-point and the Calibrated Color-Point provided by the Control & SYNC function 431 as maintained by the Array Color & Brightness Uniformity block 452, the calculated color-point deviation is then processed with a low-pass loop filter then compared to a set value of Fine Color Control range. If the color-point deviation is within the set value of the Fine Color Control range, the color-point deviation is outputted to the Fine Color Correction block 446. If the Micro Projector 401 measured color-point deviation falls outside the set value of the Fine Color Control range but within a set value of a Coarse Color Control range, its value is compared with a Coarse Color Control range and the color-point deviation is outputted to the Coarse Color Control block 447. If the Micro Projector 401 measured color-point deviation is outside the set of the Coarse Color Control range, the value of Calibrated Color-Point is then adjusted such that the measured color-point deviation falls within the Coarse Color Control range. The adjusted value of Calibrated Color-point is then provided to the Control & SYNC function 431 and is thereafter used to set the color brightness of the entire set of Micro Projectors 401. The values of the coarse and fine color control ranges are set during the factory calibration to fall within the brightness control dynamic range for the LED device 418.

As illustrated in FIG. 7, one of the Sub-image Processing functions 433 is associated with each of the Micro Projectors 401, and each is comprised of (FIG. 6B) a Sub-image Scaling block 444, a Sub-image Boundary Diffusion block 445, a Fine Color Correction block 446, a Coarse Color Correction block 447, a Gray scale PWM Conversion block 448, and a Light PWM Conversion block 449. Based on the Active Pixel Alignment input from the Control & SYNC function 432, the Sub-image Scaling block 444 maintains the sub-image alignment by assigning the sub-image pixel gray scale data received from the Image Processing function 430 to fit the sub-image Active Pixels. The Sub-image Scaling block 444 geometrically corrects the sub-image aspects to compensate for the residual tilt and rotational misalignment measured by the sub-image alignment procedure 442 and assigns the sub-image pixel gray scale data received from the Image Processing function 430 to the proper Micro projector 401 pixel address based on the sub-image Active Pixels coordinates measured by the sub-image alignment procedure 442.

Figure 8B:
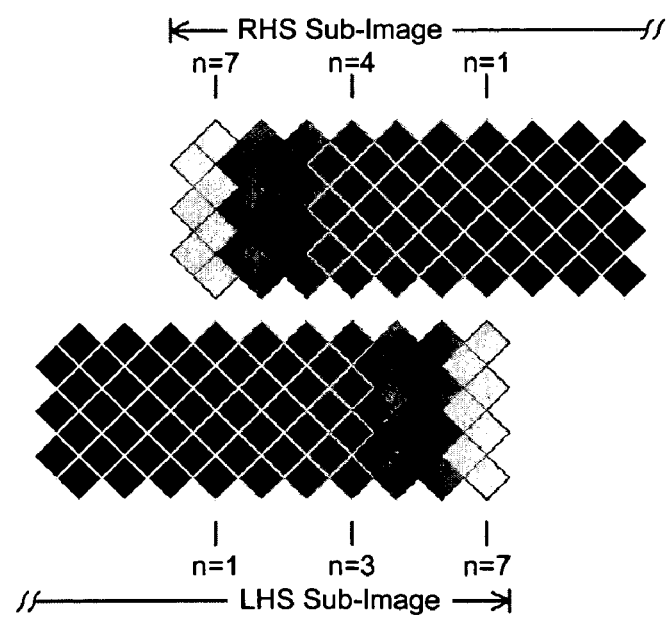
FIG. 8B illustrates the result of the Micro Projector sub-image boundary diffusion.
Figure 9:
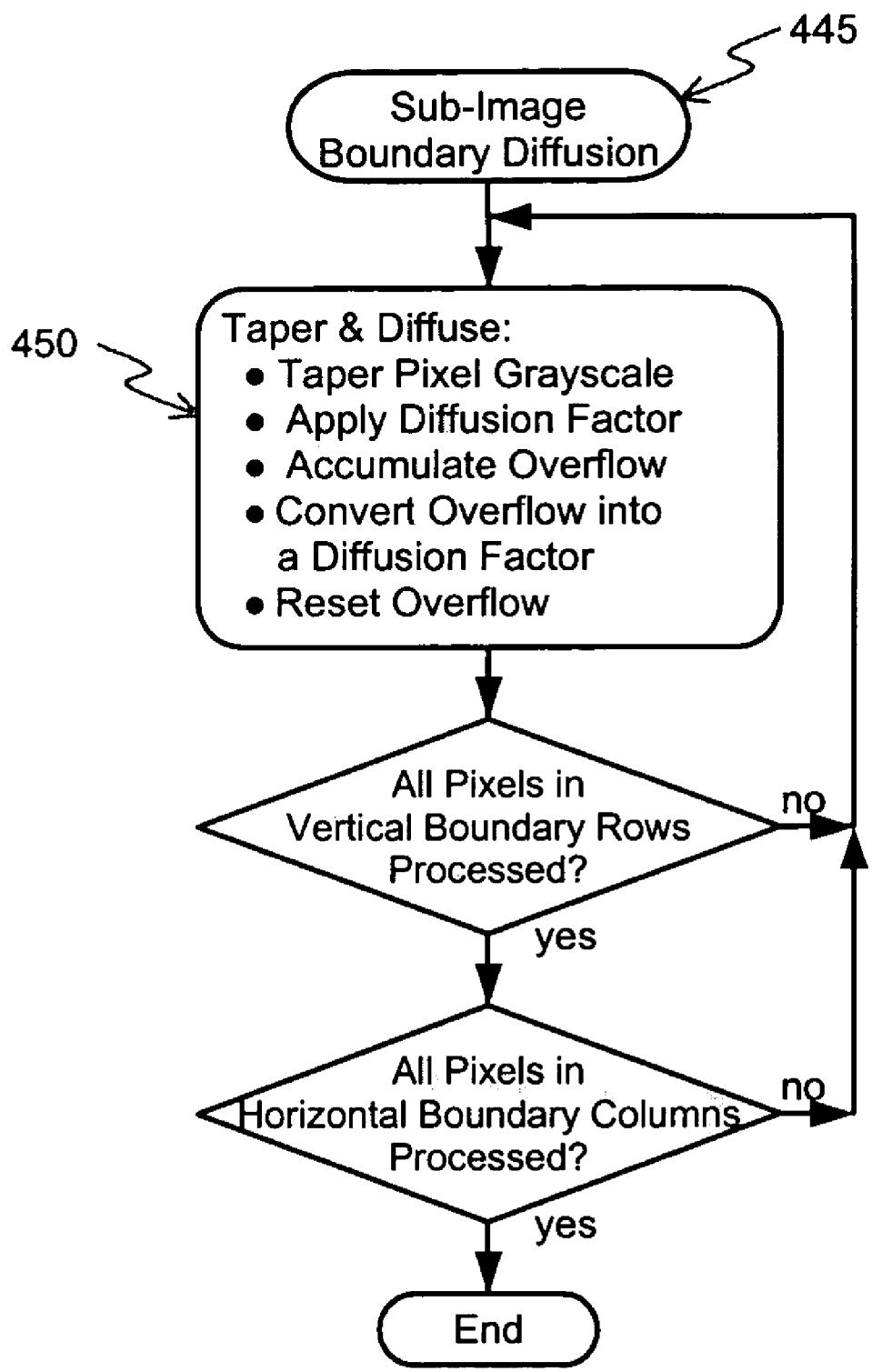
FIG. 9 illustrates the flow of Sub-image Boundary Diffusion Processing.

The objective of the Sub-image Boundary Diffusion block 445 is to taper and diffuse the gray scale of the pixels projected by adjacent Micro Projectors 401 along their respective sub-image boundary overlap borders. This serves to disperse any artifacts that may show on the image projected by the array of Micro Projectors 401 because of their possible misalignment relative to the Rear Projection Array Display device 400 projection screen aperture. The flow of the Sub-image Boundary Diffusion block 445, illustrated in FIG. 9, includes the Taper & Diffuse algorithm 450, whose result is illustrated in FIG. 8B. Referring to FIG. 9, the gray scale values of the sub-image boundary pixels are processed with the Taper & Diffuse algorithm 450 as follows:

Corrected boundary pixel gray scale:

$$G_n'(m)=A_n G_n(m)+R(m), \text{ for } n=1, 2, 3, \ldots, N$$

Where m denotes the pixel address within the projected sub-image, N denotes the number of pixels within a respective row of a vertical boundary region of overlap or within a respective column of the horizontal boundary region of overlap of the sub-image, and n denotes the pixel boundary index, which is the index of each pixel within the rows of the vertical boundary regions or within the columns of the horizontal boundary regions of the sub-image with the pixel at the interior edge of the overlap boundary region having an index n=1 and the pixel at the exterior edge of the overlap boundary region having an index n=N. $G_n(m)$ and $G_n'(m)$ denote the original pixel gray scale value and the tapered and diffused value, respectively, $A_n$ denotes the tapering coefficients, and R(m) denotes the diffusion factor applied to the pixel gray scale value, hereinafter explained. The tapering coefficients would typically be values that allow edge-complementary tapering (meaning that the tapering attenuation in either direction of the overlap boundary region add-up to 1), such as:

$$A_n=\{1-n/(N+1)\}+\alpha \sin \{2\pi(1-n/(N+1)\} \text{ for } n=1,2,3,\ldots,N, \text{ with } |\alpha|\leq\frac{1}{2}\pi$$

or any alternative edge edge-complementary tapering coefficients, such as:

$$A_n=0.5 \{1+\cos(\pi n/(N+1)\} \text{ for } n=1,2,3,\ldots,N.$$

The pixel gray scale $G_n(m)$ would typically be provided to the Taper & Diffuse algorithm 450 as an 8-bit value, while $G_n'(m)$ would typically be processed as a 16-bit value. The least significant 8-bits of $G_n'(m)$ are referred to as "overflow". In the Taper & Diffuse algorithm 450, the resultant $G_n'(m)$ value would be truncated to its most significant 8-bit and outputted as an 8-bit value, while its least significant 8-bit overflow would be accumulated. When the accumulated overflow reaches full value (rolls over), the Taper & Diffuse algorithm 450 would output an 8-bit diffusion factor R(m') with its least significant bit set to a value 1, with an address m' selected randomly from the set of addresses of pixels that are adjacent to the pixel being processed. In other words, for each pixel with address m and boundary index n in the sub-image boundary region, the Taper & Diffuse algorithm 450 processes the pair of inputs $G_n(m)$ and R(m) and generates a tapered and diffused gray scale value $G_n'(m)$ for the pixel being processed and a diffusion factor R(m') for the pixel with address m'. In order to ensure proper tapering of the 4-corner overlap regions, as shown in FIG. 9, the Taper & Diffuse algorithm 450 is applied first to the rows of pixels located within the vertical boundary region of the sub-image then to the columns of pixels located within the horizontal boundary region of the sub-image. A skilled person would appreciate that the Taper & Diffuse method described herein can be implemented with different tapering coefficients $A_n$ other than those described above. In any case, it can be shown that by applying respective tapering coefficients to the boundary pixels in each column (row) of each horizontally (vertically) adjacent sub-image followed by applying respective tapering coefficients to each row (column) of each vertically (horizontally) adjacent sub-image, coefficients will be applied to many pixels in the corners of each sub-image twice. However, the sum of the coefficients applied to any overlapping pixels will still be unity, whether three or four pixels overlap as in the corners of adjacent sub-images, or two pixels overlap, such as elsewhere.

In order for the Taper & Diffuse algorithm 450 to have the desired effect at the minimum level of the gray scale, a sufficient gray scale dynamic range must exist. When all of the pixels of the Micro Projector 401 are in the off state, there remains a small amount of light output referred to as "residual light leakage". If the gray scale dynamic range is set at the residual luminance generated by the Micro Projectors 401 when all of their respective pixels are in the off state, then the boundary region pixel gray scale cannot be tapered. As a result the pixels in the boundary overlap regions will appear slightly visible in maximally dark regions of the image that straddle the overlap boundary region or when the screen is maximally dark. In order to overcome this minimum gray scale level non-uniformity, the minimum value of the gray scale dynamic range is set during the color-point calibration procedure 443 to a value that equals four times the Micro Projector 401 residual light leakage level. In doing so, the addition of the gray scale level of the tapered pixels at the 4-corner overlap boundary regions will not exceed the minimum gray scale of the remaining pixels in the image.

The pixel gray scale output values of the Sub-image Boundary Diffusion block 445 are provided to the Fine Color Correction block 446, where it is processed together with the fine color correction value generated by the Array Uniformity Control function 431. Based on the fine color correction value generated by the Array Uniformity Control function 431, the Fine Color Correction block 446 adjusts the color coordinate of the sub-image pixels for each of the primary colors as well as for white. The color corrected sub-image pixels gray scale output of the Fine Color Correction block 446 is provided to the Gray scale PWM Conversion block 448 where it is converted from a pixel frame that is comprised of an 8-bit each for R, G, and B gray scale into pixel frame that is comprised of a 1-bit for R, G, and B gray scale. This 1-bit pixel frame for R, G, and B are then provided to the corresponding Micro Projector 401 to control the on/off state of each of its sub-image pixels. This parallel-to-serial conversion technique is known to a skilled person as pulse width modulation (PWM) conversion.

The coarse color correction value generated by the Array Uniformity Control function 431 is provided to the Coarse Color Correction block 447 where it is combined with the Calibrated Color-point value provided by the Control & SYNC block 432 into RGB color control values for the LED device 412. The RGB color control values generated by the Coarse Color Correction block 447 would typically be expressed as 8-bit values. These 8-bit color control values are used to adjust the on/off duty cycle of the RGB lights generated by the LED device 412 to reflect color correction generated by the Coarse Color Correction block 447. The Light PWM Conversion block 449 accomplishes this task by converting the 8-bit RGB color control values for the LED device 412 which are generated by Coarse Color Correction block 447 into a serial bit stream using pulse width modulation (PWM) technique.

Figure 10:
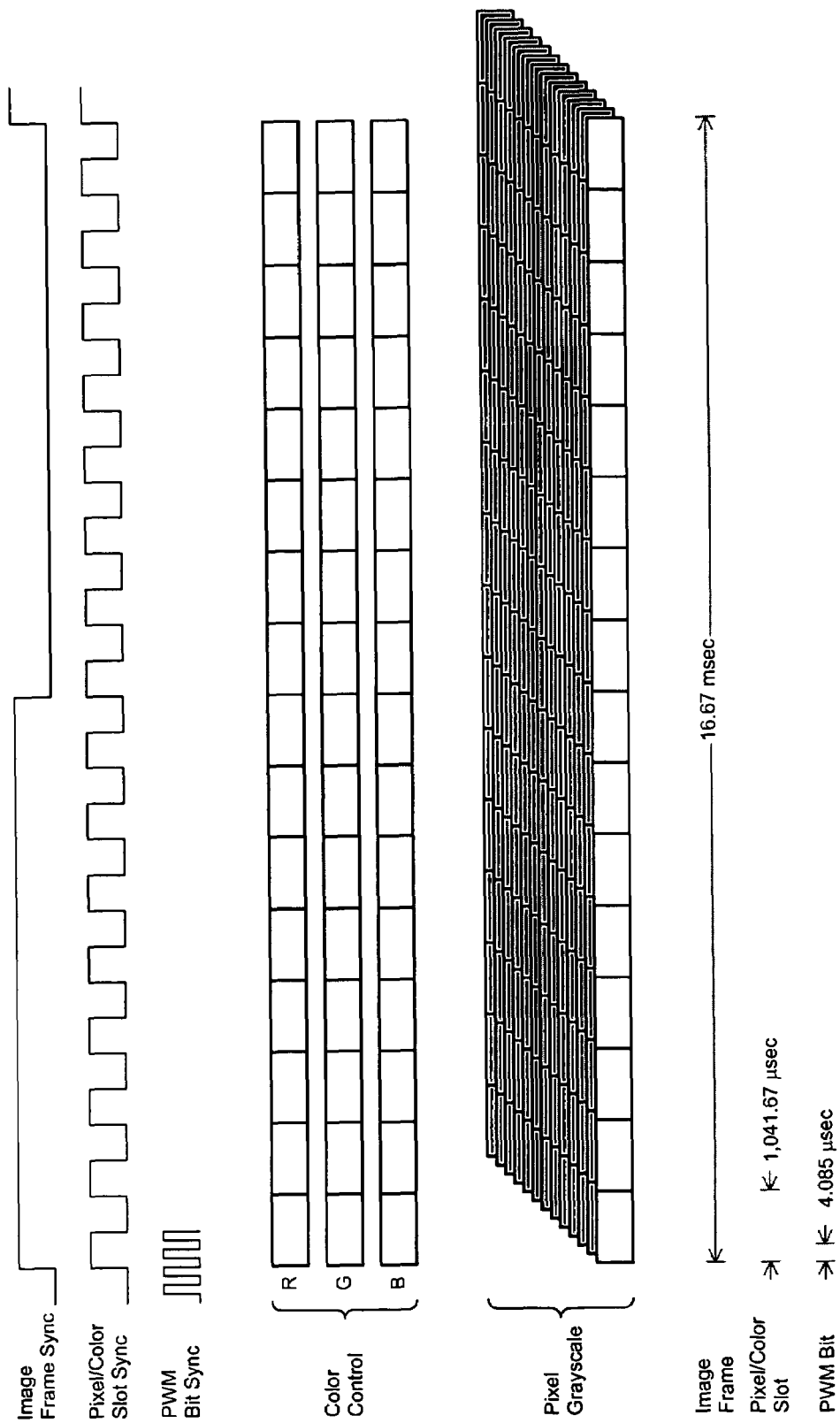
FIG. 10 illustrates the control frame for the micro-display device and the LED device.

FIG. 10 illustrates the structure of frame for controlling the LED device 412 color and the micro-display device 419 pixels gray scale. The rate for updating the gray scale of all the active pixels within a Micro Projector 401 sub-image is illustrated as a frame with duration 16.67 msec. The frame structure illustrated in FIG. 10 corresponds to a 60 Hz image frame rate digital video input, a skilled person would appreciate that the frame structure shown in FIG. 10 can easily be modified such that it corresponds with any desired image frame rate. As shown in FIG. 10, this pixel update image frame can be divided into 16 Pixel/Color slots each with a 1,041.67 µsec duration (960 Hz) to prevent flicker, which would be further divided into PWM bits with 4.085 µsec duration (244,800 Hz). The image frame, Pixel/Color slot and PWM bit sync signals, shown in FIG. 10, would be generated by the Control & SYNC function 432 based on image frame synchronization signal provided by the digital video input. The image frame, Pixel/Color slot and PWM bit sync signals would be provided to the Sub-image Processing functions 443 as well as to each of the Micro Projectors 401. The 8-bit RGB color control values for the LED device 412 generated by the Coarse Color Correction block 447 would be converted by the Light PWM Conversion block 449 into $2^8-1=255$ serial PWM bits and outputted in synchronization with the slot and bit sync signals generated by the Control & SYNC function 432.

Each one of the 16 color slots shown in FIG. 10 can be assigned to either R, G or B in a manner to obtain the required maximum brightness of each color, with the required brightness being controlled by its on/off duty cycle set by the 8-bit color control values generated by the Coarse Color Correction block 447. The number of color slots within the image frame assigned to R, G or B is set to achieve the Calibrated Color-Point and is controlled by the color correction values generated by the Coarse Color Correction block 447. This assignment of R, G or B to the color slots would be provided to the processing chain comprised of Sub-image Scaling block 444, the Array Boundary Diffusion 445, the Fine Color Correction 446 and the Gray scale PWM Conversion 448 in order to synchronize their processing and output with the slot color assignment.

Typically the digital video input provided to the Image Processing function 430 is either in RGB format or in luminance and color difference encoded format, and is converted into RGB format by the Color Space Conversion block 434. In cases when the Color Space Conversion block 434 is capable of converting the digital video input into more colors than R, G and B; for example RGB plus yellow (Y), cyan (C), magenta (M) and white (W), it would be possible with the LED control structure illustrated in FIG. 10 to generate these colors by assigning color slots to R, G and B simultaneously and using the 8-bit color control values generated by the Coarse Color Correction block 447 to adjust the brightness of the RGB LED such that the desired color is generated within that color slot.

The feedback control loop comprised of the light sensor 418, the Array Uniformity function 432, the Fine Color Correction block 446 and the Coarse Color Correction block 447, serves to maintain color and brightness uniformity across the sub-images generated by the Micro Projectors 401 and also serves to compensate for LED device color and brightness variations that may occur with changes in temperature and with aging.

In summary, the Rear Projection Array Display device 400 of the present invention overcomes the weaknesses of other displays plus exhibits the following several advantages:

1. It has a low-profile form factor because it uses an array of Micro Projectors 401 each having a small projection throw distance without extending the under-screen height;

2. It has a substantially improved reliability because it uses a spatially distributed, efficient thermal management and luminance efficient LED devices 412 as light source, eliminates the color wheel and the cooling fans;

3. It would cost less because it uses multiplicity of smaller die size micro-display devices, smaller size optical components; eliminates the Fresnel and the multiplicity of large and expensive folding mirrors; and easier to assemble and calibrate.

In the forgoing detailed description, the present invention has been described with reference to specific embodiments thereof. It will, however, be evident that various modifications and changes can be made thereto without departing from the broader spirit and scope of the invention. The design details and drawings are, accordingly, to be regarded in an illustrative rather than a restrictive sense. Skilled persons will recognize that portions of this invention may be implemented differently than the implementation described above for the preferred embodiment. For example, skilled persons will appreciate that the Rear Projection Array Display device 400 of this invention can be implemented with numerous variations to the number of Micro Projectors 401 used, the specific design details of the Micro Projector 401, the specific details of the factory calibration procedure, the specific design details of the Micro projector 401 sub-image diffusion algorithm, the specific design details of the array color & brightness uniformity control, the specific design details of the color & brightness feedback control loop, and the color control frame structure. Skilled persons will further recognize that many changes may be made to the details of the aforementioned embodiment of this invention without departing from the underlying principles thereof. The scope of the present invention should, therefore, be determined only by the following claims.

What is claimed is:

1. A rear projection display apparatus for displaying images comprising:
    a projection screen;
    a plurality of micro projectors arranged in a two dimensional array, each to project a respective sub-image onto the projection screen with the sub-images being tiled together to form a larger image, each micro projector having:
    an LED light source;
    light collimation optics disposed to collimate light from the LED light source;
    a light sensor coupled to the array controller and disposed to sense light from the LED light source;
    a micro-display device disposed to be illuminated by light from the light collimation optics; and
    projection optics disposed to project an image from the micro-display to the projection screen as a respective sub-image;
    an array controller coupled to receive image data and to provide respective sub-image data to each micro projector corrected to achieve brightness and color uniformity responsive to an output of the sensor, and scaled for seamless tiling of the sub-images to form the rear projection image.

2. The apparatus of claim 1 wherein the array controller provides each micro projector with sub-image data that includes sub-image data overlapping sub-image data provided to adjacent micro projectors, the micro projectors being arranged to project a respective sub-image overlapping adjacent sub-images, the array controller being configured to control the brightness of individual sub-images to provide uniform brightness across each sub-image overlap and non-overlap areas and uniform brightness across adjacent sub-images.

3. The apparatus of claim 2 wherein the array controller reduces the brightness of pixels in the area of overlap of each sub-image from a maximum adjacent non-overlapping pixels to a minimum at the edge of the overlapping pixels.

4. The apparatus of claim 3 wherein the array controller reduces the brightness of each pixel's color components in the area of overlap of each sub-image by applying tapering coefficients in the area of overlap between adjacent images in a first direction in the array, followed by applying tapering coefficients in the area of overlap between adjacent images in a second direction in the array.

5. The apparatus of claim 3 wherein the brightness of pixels in each sub-image is controlled by controlling the relative duration the respective pixel's color components on the projection screen is illuminated.

6. The apparatus of claim 5 wherein the array controller is configured to set a minimum level of gray scale dynamic range of a displayed sub-images to a value that at least equals four times the residual light leakage of each micro projector.

7. The apparatus of claim 5 further comprised of a separator between the micro projectors and the projection screen, the separator outlining each area of the projection screen within which each respective micro projector will illuminate.

8. The apparatus of claim 1 wherein the light collimation optics comprises a light integrator and light path optics, including light path folding mirrors.

9. The apparatus of claim 1 wherein the micro-display device comprises a plurality of reflective pixels.

10. The apparatus of claim 9 wherein the array controller is configured to control the on/off states of each pixel of the micro-display device in synchronism with the on/off states of each color of the LED device.

11. A rear projection display apparatus for displaying images corrmprising:
    a projection screen;
    a plurality of micro projectors arranged in a two dimensional array, each to project a respective sub-image onto the projection screen with the sub-images being tiled together to form a larger image, each micro projector having:
    an LED light source;
    light collimation optics having a light integrator and light path optics and disposed to collimate light from the LED light source;
    a light sensor optically coupled to the light integrator, and coupled to the array controller and disposed to sense light from the LED light source;
    a micro-display device disposed to be illuminated by light from the light collimation optics; and,
    projection optics disposed to project an image from the micro-display to the projection screen as a respective sub-image;
    an array controller coupled to receive image data and to provide respective sub-image data to each micro projector corrected to achieve brightness and color uniformity responsive to an output of the sensor, for position and angle and scaled for seamless tiling of the sub-images to form the rear projection image.

12. The apparatus of claim 1 wherein the LED device comprises an LED device capable of controllably emitting the colors of red, green and blue light.

13. The apparatus of claim 12 wherein the rear projection images are video images.

14. The apparatus of claim 12 wherein the array controller is configured to control the on/off states of each of the colors of the LED device.

15. The apparatus of claim 12 wherein a light sensor is disposed to sense each color of light from the LED light source, and wherein the array controller is configured to control the brightness of each color in each pixel in the image projected onto the projection screen by simultaneously adjusting the gray scale value of each pixel color component and adjusting the brightness of the respective color of the LED light source of the respective micro projector.

16. The apparatus of claim 15 wherein the array controller is configured to control the brightness of each color in each pixel in an image projected onto the projection screen by adjusting the time duration that that color is projected onto the projection screen for that pixel.

17. The apparatus of claim 15 wherein the array controller is configured to control the brightness of each color in each pixel in an image projected onto the projection screen by adjusting the brightness of the color of the LED light source of respective micro projector.

18. A rear projection display apparatus for displaying images comprising:
   a projection screen;
   a plurality of micro projectors arranged in a two dimensional array, each to project a respective sub-image onto the projection screen with the sub-images overlapping adjacent sub-image and being filed together to form a larger image;
   an array controller coupled to receive image data and to provide respective sub-image data to each micro projector with edge-complementary tapering of the color components grayscale values of pixels in the sub-image regions of overlap.

19. The apparatus of claim 18 wherein the array controller reduces the brightness of the color components of pixels in the area of overlap of each sub-image by applying tapering coefficients in the area of overlap between adjacent images in a first direction in the array, followed by applying tapering coefficients in the area of overlap between adjacent images in a second direction in the array.

20. The apparatus of claim 18 wherein the array controller is configured to set a minimum level of gray scale dynamic range of a displayed image to a value that at least equals four times the residual light leakage of the micro projectors.

21. The apparatus of claim 18 further comprised of a light sensor optically coupled to each micro projector, and wherein the array controller is responsive to outputs of the light sensors to control the light source of each micro projector to provide uniform light intensity in each of the sub-images.

22. The apparatus of claim 21 wherein the array controller is configured to correct sub-image data to achieve brightness and color uniformity and seamless tiling of the sub-images to form the rear projection image.

23. The apparatus of claim 18 wherein the brightness of pixels in each sub-image in the area of overlap is controlled by controlling the relative duration the respective pixel color components on the projection screen is illuminated.

24. The apparatus of claim 23 further comprised of a separator between the micro projectors and the projection screen, the separator outlining each area of the projection screen within which each respective micro projector will illuminate.

25. The apparatus of claim 18 wherein each micro projector comprises:
   an LED light source;
   light collimation optics disposed to collimate light from the LED light source;
   a light sensor coupled to the array controller and disposed to sense light from the LED light source;
   a micro-display device disposed to be illuminated by light from the light collimation optics; and,
   projection optics disposed to project an image from the micro-display to the projection screen as a respective sub-image;
   the array controller being configured to control the brightness of each sub-image responsive to an output of the sensor.

26. The apparatus of claim 25 wherein the light collimation optics comprises a light integrator and light path optics, including light path folding mirrors.

27. The apparatus of claim 25 wherein the LED device comprises an LED device capable of controllably emitting the colors of red, green and blue light.

28. The apparatus of claim 27 wherein the rear projection images are video images.

29. The apparatus of claim 27 wherein the array controller is configured to control the on/off states of each of the colors of the LED device.

30. The apparatus of claim 27 wherein a light sensor is disposed to sense each color of light from the LED light source, and wherein the array controller is configured to control the brightness of each color in each pixel in the image projected onto the projection screen by simultaneously adjusting the gray scale value of each pixel color component and adjusting the brightness of the respective color of the LED light source of the respective micro projector.

31. The apparatus of claim 30 wherein the array controller is configured to control the brightness of each color in each pixel in an image projected onto the projection screen by adjusting the time duration that color is projected onto the projection screen for that pixel.

32. The apparatus of claim 30 wherein the array controller is configured to control the brightness of each color in each pixel in an image projected onto the projection screen by adjusting the brightness of the respective color of the LED light source of the respective micro projector.

33. The apparatus of claim 25 wherein the micro-display device comprises a plurality of reflective pixels.

34. The apparatus of claim 33 wherein the array controller is configured to control the on/off states of the each pixel of the micro-display device in synchronism with the on/off states of each color of the LED device.

35. A rear projection display apparatus for displaying images comprising:
   a project on screen;
   a plurality of micro projectors arranged in a two dimensional array, each to project a respective sub-image onto the projection screen with the sub-images overlapping adjacent sub-images and being tiled together to form a larger image, each micro projector having;
   an LED light source;
   light collimation optics, including a light integrator and light path optics, disposed to collimate light from the LED light source;
   a light sensor optically coupled to the light integrator, and coupled to the array
   controller and disposed to sense light from the LED light source;
   a micro-display device disposed to be illuminated by light from the light collimation optics; and,
   projection optics disposed to project an image from the micro-display to the projection screen as a respective sub-image;

the array controller being configured to control the brightness of each sub-image responsive to an output of the sensor;

an array controller coupled to receive image data and to provide respective sub-image data to each micro projector with edge-complementary tapering of the color components gray scale values of pixels in the sub-image regions of overlap.

36. A rear projection display apparatus for displaying color video images comprising:

a projection screen having a front surface for viewing and a rear surface;

a plurality of micro projectors arranged in a two dimensional array, each to project a respective sub-image onto the rear surface of the projection screen with the sub-images overlapping adjacent sub-images and with the sub-images being tiled together to form a larger image, each micro projector having;

an LED light source capable of controllably emitting red, blue and/or green light;

light collimation optics disposed to collimate light from the LED light source;

a light sensor coupled to the array controller and disposed to sense light from the LED light source;

a micro-display device disposed to be illuminated by light from the light collimation optics, the micro-display device having a plurality of reflective pixels for controllably reflecting light to a respective pixel in the projection screen when on and not reflecting light to the projection screen when off; and, projection optics disposed to project an image from the micro-display to the projection screen as a respective sub-image;

an array controller coupled to receive video image data and to provide respective sub-image data to each micro projector with edge-complementary tapering in the sub-image regions of overlap and corrected to achieve brightness and color uniformity and scaled for seamless tiling of the sub-images to form the rear projection image;

the array controller also being responsive to an output of the light sensor to maintain the gray scale level of each color in each sub-image in the rear projection image.

37. The apparatus of claim 36 wherein the array controller is configured to maintain the gray scale level of each color in a sub-image by altering the on time for each color in each pixel of the sub-image.

38. The apparatus of claim 36 wherein the array controller is configured to maintain the gray scale level of each color in each pixel of a sub-image by adjusting the brightness of the respective color emitted by the LED device of the respective micro projector.

39. The apparatus of claim 36 wherein the array controller is configured to maintain the gray scale level of each color in each pixel of each sub-image by adjusting the brightness of the respective color emitted by the LED devices of the plurality of micro projectors.

40. The apparatus of claim 36 wherein the array controller is configured to maintain the gray scale level of each color in a sub-image by altering the on time for each color in each pixel of the sub-image for small deviations from a predetermined gray scale level, and in synchronism adjusting the brightness of the respective color emitted by the LED device of the respective micro projector for larger deviations from the predetermined gray scale level, and in synchronism adjusting the brightness of the respective color emitted by the LED devices of all micro projectors for still larger deviations from the predetermined gray scale level.

41. A method of rear projection of a color image comprising:

providing a rear projection screen;

providing a plurality of micro projectors arranged in a two dimensional array, each for projecting a sub-image forming a respective part of the color image onto the rear projection screen, each micro projector having an LED light source capable of controllably providing red, blue and/or green light, and a micro-display device disposed to be illuminated by the LED light source and having a plurality of reflective pixels for controllably reflecting light from the LED light source to a respective pixel on the projection screen when on and not reflecting light to the projection screen when off;

receiving image data and associating respective parts of the image data with each micro projector as sub-image data;

correcting the sub-image data associated with each micro projector to achieve brightness and color uniformity and scaled to achieve seamless tiling of the sub-images to form the color image; and, projecting each sub-image corresponding to the respective corrected sub-image data onto the rear projection screen by the respective micro projector for seamless tiling of the sub-images to farm the color image.

42. The method of claim 41 further comprised of controlling the brightness of each color of in each sub-image projected to provide uniform brightness in the rear projection image.

43. The method of claim 42 wherein the brightness of each color in each sub-image projected is controlled by adjusting the duty cycle of the respective color in the respective sub-image.

44. The method of claim 42 wherein the brightness of each color in each sub-image projected is controlled by controlling the brightness of the respective color from the respective LED light source.

45. The method of claim 42 wherein the sub-image data associated with each micro projector overlaps the sub-image data associated with adjacent micro projectors, and further comprising applying tapering coefficients to pixels in the area of overlap of sub-images to control the brightness of individual sub-images in the area of overlap and non-overlap areas to uniform brightness across adjacent sub-image.

46. The method of claim 45 wherein the brightness of pixels in the areas of overlap of each sub-image are controlled to range from a maximum adjacent non-overlapping pixels to a minimum at the edge of the overlapping pixels and the minimum brightness of each sub-images pixels is set to a value that is at least equal to four times the residual light leakage of each micro projector.

47. The method of claim 46 wherein the brightness of pixels in the area of overlap of each sub-image is controlled by applying tapering coefficients in the area of overlap between adjacent images in a first direction in the array, followed by applying tapering coefficients in the area of overlap between adjacent images in a second direction in the array.

48. The method of claim 41 wherein the brightness of the sub-image for a given color is controlled by adjusting the LED light source on/off states to allow any combinations of the red, green and blue LED light sources to be in the on state simultaneously.

* * * * *